United States Patent [19]

Thuraisingham

[11] Patent Number: 5,481,700
[45] Date of Patent: Jan. 2, 1996

[54] APPARATUS FOR DESIGN OF A MULTILEVEL SECURE DATABASE MANAGEMENT SYSTEM BASED ON A MULTILEVEL LOGIC PROGRAMMING SYSTEM

[75] Inventor: Bhavani M. Thuraisingham, Lexington, Mass.

[73] Assignee: The Mitre Corporation, Bedford, Mass.

[21] Appl. No.: 807,940

[22] Filed: Dec. 16, 1991

Related U.S. Application Data

[63] Continuation-in-part of Ser. No. 767,258, Sep. 27, 1991, Pat. No. 5,355,474.
[51] Int. Cl.$^6$ ........................................ G06F 17/30
[52] U.S. Cl. ........................ 395/600; 364/DIG. 1; 364/282.1; 364/274; 364/274.3; 395/10
[58] Field of Search ................. 364/513; 380/25; 395/51, 61, 50, 600, 10

[56] References Cited

U.S. PATENT DOCUMENTS

| | | | |
|---|---|---|---|
| 4,962,533 | 10/1990 | Krueger et al. | 380/25 |
| 5,058,033 | 10/1991 | Bonissone et al. | 364/513 |
| 5,119,318 | 6/1992 | Paradies et al. | 395/61 |
| 5,191,638 | 3/1993 | Wakami et al. | 395/51 |
| 5,208,898 | 5/1993 | Funabashi et al. | 395/50 |

OTHER PUBLICATIONS

Shafer et al., EDS, Readings in Uncertain Reasoning, Morgan Kaufmann, 1990, (Table of Contents).
Ginsberg, E. D., Readings in Nonmonotonic Reasoning, Morgan Kaufmann, 1987, (Table of Contents).
Ramsey, Formal Methods in Artificial Intelligence, Cambridge University Press, 1988, (selected pages).
Delahaye, Formal Methods in Artificial Intelligence, John Wiley & Sons, 1987, (selected pages).

*Primary Examiner*—Thomas G. Black
*Assistant Examiner*—Wayne Amsbury
*Attorney, Agent, or Firm*—Choate, Hall & Stewart

[57] ABSTRACT

Apparatus for designing a multilevel secure database management system based on a multilevel logic programming system. The apparatus includes a multilevel knowledge base which has a multilevel database in which data are classified at different security levels. The multilevel knowledge base also includes schema, which describe the data in the database, and rules, which are used to deduce new data. Also included are integrity constraints, which are constraints enforced on the data, and security constraints, which are rules that assign security levels to the data. The system further includes users cleared to the different security levels for querying the multilevel database, and a multilevel logic programming system is provided for accessing the multilevel knowledge base for processing queries and for processing the integrity and security constraints. The multilevel database management system makes deductions and gives complete answers to queries and prevents certain unauthorized inferences.

5 Claims, 1 Drawing Sheet

APPARATUS FOR DESIGN OF A MULTILEVEL SECURE DATABASE MANAGEMENT SYSTEM BASED ON A MULTILEVEL LOGIC PROGRAMMING SYSTEM

This is a continuation-in-part of application entitled, "Apparatus and Method for Security Constraint Processing in Multilevel Secure Database Management Systems," by Bhavani Thuraisingham et al., filed Sep. 27, 1991, and accorded Ser. No. 07/767,258, now U.S. Pat. No. 5,355,474, issued Oct. 11, 1994.

BACKGROUND OF THE INVENTION

The present invention describes a logic for multilevel secure databases. By using such logic not only can multilevel databases be formalized, the proof procedures can be used to process security constraints efficiently and subsequently control inferences in multilevel secure database management systems. The motivation for this work is given below. The teachings of the references cited in this specification are herein incorporated by reference.

Database management systems have for some time used mathematical logic as their conceptual framework. Current database management systems are involved in complex deduction and decision-making processes, encouraging further development of logic programming for increasingly powerful and intelligent database management systems. See Cohen, B., 1989, "Merging Expert Systems and Database Systems," *AI-EXPERT*, Vol. 2, No. 2; "ICOT Project," 1987, *New Generation Computing Journal*, Vol. 5; and Gallaire, H., and J. Minker, 1978, *Logic and Databases*, Plenum Press, New York.

While logic programming researchers were making significant progress in the area of logic and databases, Gallaire, H., and J. Minker, 1978, *Logic and Databases*, Plenum Press, New York; Reiter, R., 1978, "On Closed-World Databases," (Editors: H. Gallaire and J. Minker), *Logic and Databases*, New York: Plenum Press; Clark, K., (Editors: H. Gallaire and J. Minker), 1978, "Negation as Failure," *Logic and Databases*, Plenum Press, New York; Kowalski, R. A. (Editors: H. Gallaire and J. Minker), 1978, "Logic for Data Description," *Logic and Databases*, New York: Plenum Press; Nicolas, J., and K. Yazdania, (Editors: H. Gallaire and J. Minker), 1978, "Integrity Checking in Deductive Databases," *Logic and Databases*, New York: Plenum Press; Lloyd, J., 1987, *Foundations of Logic Programming*, (2nd Edition), Heidelberg, Germany: Springer Verlag; and Minker, J., 1988, *Foundations of Deductive Databases and Logic Programming*, Morgan Kaufmann, the security researchers contributed towards the design and development of multilevel-secure relational database management systems. In such database systems, the users cleared at different security levels can access and share a database with data at different sensitivity levels without violating security, Hinke, T. and M. Schaefer, November 1975, *Secure Data Management System*, RADC-TR-75-266, System Development Corporation; Grohn, M., 1976, *A Model of a Protected Data Management System*, ESD-TR-76-289, Ottawa, Canada: I. P. Sharp Associates Limited; Graubart, R. D., and J. P. L. Woodward, April 1982, "A Preliminary Naval Surveillance DBMS Security Model," Proceedings of the 1982 IEEE Symposium on Security and Privacy, Oakland, Calif.; Graubart, R. D., and K. Duffy, April 1985 "Design Overview for Retrofitting Integrity-Lock Architecture onto a Commercial DBMS," Proceedings of the 1985 Symposium on Security and Privacy, Oakland, Calif.; Denning, D. E., at al., April 1987, "A Multilevel Relational Data Model," Proceedings of the IEEE Symposium on Security and Privacy, Oakland, Calif.; O'Conner, J. and J. Gray, October 1988, "Query Processing in a Secure Distributed Architecture," Proceedings of the 11th National Computer Security Conference, Baltimore, Md.; Garvey, C., and A. Wu, April 1988, "ASD-Views," Proceedings of the 1988 IEEE Symposium on Security and Privacy, Oakland, Calif.; Stachour, P., M. B. Thuraisingham, and P. Dwyer, October 1988, "Update Processing in LDV—A Secure Database Management System," Presented at the 11th National Computer Security Conference, Baltimore, Md.; and Thuraisingham, M. B., 1989, "Towards the Design of a Secure Data/Knowledge Base Management System," Accepted for Publication in *Data and Knowledge Engineering Journal*. Despite all these advances in multilevel databases, a logic for reasoning in a multilevel environment or a logic programming system for multilevel environments does not exist at present. As a result, the multilevel data/knowledge base management systems lack several features that have been successfully incorporated into the traditional data/knowledge base management systems. These include constraint processing, deductive reasoning, and handling efficient proof procedures.

An early attempt was made to view multilevel databases through first-order logic, Thuraisingham, M. B., (Editor: T. Lunt), May 1988, "Foundations of Multilevel Databases," Presented at the 1st RADC Database Security Invitational Workshop, Menlo Park, Calif. (Proceedings published by Springer Verlag, Heidelberg, Germany). Although not entirely successful, this approach helped gain an insight into utilizing formal logic to develop multilevel systems. That is, classical first order logic, being monotonic, was found to be an inappropriate tool for formalizing concepts in multilevel databases. This is because it is possible for users at different security levels to have different views of the same entity. In other words, statements that are assumed to be true at one security level can very well be false at a different security level. In other words, the universe in a multilevel environment is decomposed into multiple-worlds, one for each security level. A Nonmonotonic Typed Multilevel Logic (NTML) for reasoning in multilevel environments is disclosed in this specification.

The invention extends typed first order logic to support a multilevel environment. In this disclosure we introduce the development of NTML. In addition, the disclosure describes our research on various related topics that are essential for the development of successful multilevel intelligent data/knowledge base management systems. These include (1) viewing multilevel databases through NTML, (2) developing the essential points of a logic programming language for multilevel systems based on NTML, (3) designing techniques for security/integrity constraint processing for multilevel secure database management systems, and (4) proposing extensions to NTML in order to support reasoning in the midst of uncertain nonmonotonic, incomplete, precise and imperfect knowledge.

SUMMARY OF THE INVENTION

A propositional logic for multilevel systems is disclosed and claimed, called Nonmonotonic Propositional Multilevel Logic (NPML) This is a language of propositions for a multilevel environment.

A Nonmonotonic Typed Multilevel Logic (NTML) is disclosed. This logic extends first order logic for reasoning to a multilevel environment.

Three approaches to formalizing multilevel database concepts using NTML are disclosed. In the first approach, the multilevel database, the schema and the integrity constraints are expressed as the proper axioms of NTML which has the multilevel real world as its interpretation. In the second approach, the schema and the integrity constraints are expressed as the proper axioms of an NTML theory whose model is the multilevel database.

In the third approach, parts of the integrity constraints are treated as integrity rules and the rest as derivation rules. Issues related to element level classification, handling data dependencies and the inference problem are also treated in the framework of NTML.

The essential points of a logic programming language called NTML-Prolog are disclosed. A resolution rule that could be used by the control component of logic programming systems for multilevel application is disclosed, which is designed to serve the same role vis-a-vis multilevel knowledge-based applications that Prolog has served vis-a-vis knowledge-based applications.

A method for handling negative information in multilevel databases is disclosed. Specifically, multilevel analogs of the closed world assumption of Raymond Reiter, Reiter, R., 1978, "On Closed-World Databases," (Editors: H. Gallaire and J. Minker), *Logic and Databases*, New York: Plenum Press, and negation as a failure inference rule of Keith Clark, Clark, K., (Editors: H. Gallaire and J. Minker), 1978, "Negation as Failure," *Logic and Databases*, Plenum Press, New York, are disclosed.

A method for handling integrity/security constraints is disclosed, whereby the constraints are treated as (1) integrity rules which must be satisfied by the data in the database and (2) derivation rules which are used to deduce new information. Integrity constraints are defined in the current application as the constraints enforced in traditional database systems and the security constraints which are used to assign security levels to the data.

The essential points of a set of logics for multilevel knowledge base management systems are disclosed. They are extensions of NTML that provide the database management system with the capability for reasoning with uncertain, imprecise and incomplete knowledge.

Situational-NTML is disclosed as a logic for applications where there is a need for storing and manipulating knowledge in a multilevel changing universe. This logic is an extension of NTML based on concepts in situational logic.

Nonmonotonic NTML is disclosed as a logic allowing for default reasoning, and thus extending the applicability of NTML to a multilevel changing universe.

A further logic allowing reasoning under uncertainty is disclosed. It is based on principles of fuzzy logic systems and is therefore called Fuzzy-NTML.

An object-oriented approach to knowledge base management systems is disclosed and claimed as a logic under the name of Object-NTML.

Temporal logic uses classical first order logic to reason about time by considering time points like any other entities in the domain of a relational structure. A new logic called Temporal-NTML, which extends NTML according to principles of temporal logic, is disclosed.

DESCRIPTION OF THE PREFERRED EMBODIMENT

Section 2

Figure 1:
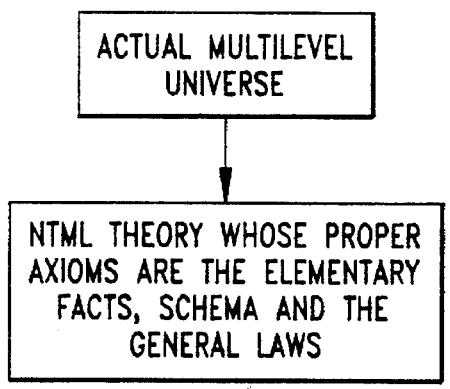
FIG. 1 is a block diagram representing perceived multilevel universe represented as an NTML theory whose interpretation is the actual multilevel universe.

Propositional Logic for Multilevel Environments 2.1 Overview

In this section, we develop a propositional logic for multilevel environments. We call this logic Nonmonotonic Propositional Multilevel Logic, or NPML. In this logic, truth values are assigned to propositions with respect to security levels. In the ensuing discussion, we assume that if L1 and L2 are two security levels, then either $L1 \leq L2$ or $L2 \leq L1$. The discussion can, however, be extended to include incomparable security levels.

Since the main objective of this paper is to develop a logic for multilevel databases, our treatment of NPML will be brief. The purpose of introducing NPML is to show how it can be extended to NTML with support for quantification over variables and types. The relationship between NPML and NTML is analogous to that between propositional logic and first-order logic. It should be noted however that the discussion on NPML, although useful, is not a prerequisite to understanding the ensuing sections of this paper.

In section 2.2, we discuss the semantics of NPML. NPML theory is the subject of section 2.3.

2.2 Truth Assignments to Propositions with Respect to Security Levels

The universe consists of a set of statements (or propositions). Each statement is assigned a security level. This is the inherent security level of the statement. A statement can be true or false with respect to a security level L, provided L dominates the inherent security level of the statement. Since the statements in the universe have different security levels, the universe is multilevel. In this section, we discuss how statements may be assigned truth values with respect to security levels.

One can form more complex statements, which are called well-formed formulas (wwfs) from the statements (or propositions) as follows:

(a) Every statement is a wwf;

(b) If A and B are two wwfs, then so are $\neg A$, $A \wedge B$, $A \vee B$, $A \rightarrow B$.

If the inherent security levels of the wwfs A and B are L1 and L2 respectively, and if the least upper bound of L1 and L2 is L, then the inherent security levels of $\neg A$, $A \wedge B$, $A \vee B$, $A \rightarrow B$ and L1, L, L, and L, respectively. A formula W may be assigned a truth value with respect to a security level L if the inherent level of W is dominated by L.[1]

[1] One can think of the inherent security level of a formula as the level at which the existence of that formula can be seen. It does not make sense to assign truth values to a formula as a level below its inherent security level. The inherent level of a formula is assumed to be part of the formula.

If A is assigned a truth value True with respect to L, then $\neg A$ is assigned False with respect to L. Similarly, if A is assigned the value False with respect to L, $\neg A$ is assigned True with respect to L. Assuming A and B have truth values at a security level L, Table 1 shows that truth assignments for $A \wedge B$, $A \vee B$, $A \rightarrow B$.

The following comments are in order:

We assume that the logic is nonmonotonic.[2] We make this assumption because it is possible for users at different security levels to have different views of the same entity.

[2] Nonmonotonicity is with respect to different security levels only. In section 8 we propose extensions of NTML to reason nonmonotonically within a security level.

For example, it is possible for a statement to be true at security level L and be false at a security level L' (where either L'<L or L'>L).

P and $\neg$P cannot both be asserted true at a security level. This point will be addressed later when we discuss NPML theories.

Had we assumed that the logic is monotonic (that is, once a statement is asserted to be true at L, then it is true at all security levels L'>L), then the following holds:

If A is true at L, then $\neg$A is false at L.

If A is true at L1 and B is true at L2, and L1$\geq$L2, then A$\wedge$B is true at L1.

If A is true at L1 and B is true at L2, and L1$\geq$L1, then A$\vee$B is true at L2.

If A is true at L1 and B is true at L2, then A$\rightarrow$B is true at L2.

TABLE 1

Truth Table at Security Level L

| A | B | A$\wedge$B | A$\vee$B | A $\rightarrow$ B |
|---|---|---|---|---|
| T | T | T | T | T |
| T | F | F | T | F |
| F | F | F | F | T |
| F | T | F | T | T |

2.3 Theory of NPML

In this section, we discuss the essential points of an NPML theory. An NPML theory consists of a set a logical axioms, a set of proper axioms, and a set of inference rules. The logical axioms are analogous to those of propositional logic and are given in Table 2. Each logical axiom has a security level associated with it. This is the minimum level in which the axiom evaluates to true. Note that this level is the least upper bound of the inherent security levels of the wffs associated with the axiom.

The proper axioms of any NPML theory include the relationships between the security levels supported by the system. These axioms are also shown in Table 2 where we assume that the security levels are L1,L2, . . . Ln. The remaining proper axioms can be formed from a subset {W1, W2, ... Wn} of wffs as follows. For each Wi (1$\leq$ i$\leq$n), (Wi, L)[3] is explicitly asserted to be a proper axiom of the theory if:

Wi evaluates to true with respect to L, and

It is not the case that (Wi, L*) is a proper axiom where L* is just less than L.[4]

Note that if L is just less than L+ and if Wi does not evaluate to true with respect to L+, then ($\neg$Wi, L+) is asserted to be a proper axiom. We make an important assumption that the set of proper axioms of an NPML theory with respect to any security level is consistent.

[3] The security level associated with an axiom is not its inherent security level. It is the level at which the axiom is asserted.

[4] A level L1 is just less than a level L2 if L2 dominates L1 and there is no security level L* such that L1<L*<L2.

For example, the axioms P,P$\rightarrow\neg$Q and Q cannot be the proper axioms of any theory with respect to any security level.

Table 2 also shows the rules of inference of the NPML theory. The rules of inference are (MP) and Deduction Across Security Levels (DASL). Note that the rule DASL has been introduced specifically to support a multilevel universe.

The theorems of an NPML theory are deduced from the axioms using the rules of inference. For example, (F,L) is denoted a theorem of the NPML theory T if either (F,L) is an axiom of T or (F,L) can be derived from the axioms using the rules of inference. That is, there exists a derivation (P1,L1), (P2,L2) . . . (Pn, Ln) such that (Pn,Ln)=(F,L) and for each i (1$\leq$i$\leq$n) Li$\leq$L, (Pi, L) holds, each (Pi,Li) is either an axiom of T or it can be derived from (P1,L1), (P2,L2) . . . (Pi–1,Li–1) using the rules of inference.

One can define consistency, soundness, and completeness of an NPML theory as follows. An NPML theory is consistent if there is not a wff F and a security level L such that (F,L) and ($\neg$F,L) are its theorems. An NPML theory is sound if for every theorem (F,L), F evaluates to true with respect to L. An NPML theory is complete if for every wff F and security level L, if F evaluates to true with respect to L, then (F,L) is a theorem.

We obtain the following theorem.

Theorem 1

An NPML theory is consistent, sound, and complete.

Proof of Theorem 1: The proof uses techniques similar to the ones used to show the consistency, soundness, and completeness of propositional logic given in Mendleson, E. 1979, *Introduction to Mathematical Logic*, Princeton, N.J.: Van Nostrand.

TABLE 2

NPML Theory

Logical Axioms

If A, B, and C are NPML wffs whose inherent security levels are L1, L2, and L3, and the least upper bound of L1, L2, and 13 is L, and the least upper bound of L1 and L2 is L*, then the following are the logical axioms of an NPML theory:
(A $\rightarrow$ (B $\rightarrow$ A)), L*
((A $\rightarrow$ (B $\rightarrow$ C)) $\rightarrow$ ((A $\rightarrow$ B) $\rightarrow$ (A $\rightarrow$ C))), L
(($\neg$ B $\rightarrow \neg$ A) $\rightarrow$(($\neg$ B $\rightarrow$ A) $\rightarrow$ B)), L*

Part of the Proper Axioms

The security Level 2 dominates the level L1, system-low.
The security level L3 dominates the level L2, system-low.
The security level Ln dominates the level Ln-1, system-low.

Rules of Inference

TABLE 2-continued

NPML Theory

MP: (B,L) is a direct consequence of (A,L) and (A_→ G,L), where L is one of the security levels L1, L2, L3, ... Ln, system-low DASL: (P,Lj) is a direct consequence of (P,Li), ¬ (¬ P,Lj) and the security level Lj dominates the level Li, system-low.

Section 3

Logic for Multilevel Databases

We develop a Nonmonotonic Typed Multilevel Logic, called NTML, to formalize concepts in multilevel databases. We describe NTML language, NTML semantics, and NTML theories in the next three subsections.

3.1 NTML Syntax

The syntax of NTML is typed first-order logic with extensions to support multilevel security. We define the primitive symbols, terms, and formulas of the language. Security properties are enforced for each symbol, term, and formula. Any NTML theory based on this syntax must satisfy these properties.[5]

[5] In section 9 we will formally specify these security properties.

Primitive Symbols

A type symbol denoted by a string of one or more letters (each letter could be subscripted) has a security level assigned to it. If TS is a type symbol, then its security level (also called the inherent level of TS) is denoted by Level(TS).[6]

[6] To simplify the syntax, one possibility would be to assign the lowest security level (i.e., system-low) to all the symbols of the language. Truth values could be assigned with respect to the various security levels.

A variable symbol denoted by a string of one or more letters (each letter could be subscripted) has a type and a security level assigned to it. If VS is a variable symbol whose type and level (also called the inherent level of VS) are T and L respectively, then Type(VA)=T and Level(VS)= L. The following security property must be satisfied.

SP1: $Level(VS) \geq Level(Type(VS))$

A constant symbol consists of a type and a security level. If CS is a constant symbol whose type and level (also called the inherent level of CS) are T and L, respectively, then Type(CS)=T and Level(CS)=L. The following security property must be satisfied.

SP2: $Level(CS) \geq Level(Type(CS))$

A function symbol consists of a type and a level. Associated with each function symbol are its specified arguments, the types of its arguments and the type of its value. If a function symbol FS has n arguments, then FS is an n-plane function symbol. If T1, T2, T3 ... Tn are the types of the arguments and T is the type of the value, then the type of the function symbol FS denoted Type(FS) is $T1 \times T2 \times T3 \times \ldots Tn \rightarrow T$. The level of FS (also called the inherent level of FS) is denoted by Level(FS). The following security property must be satisfied:

SP3: $Level(FS) \geq l.u.b.(Level(T1), Level(T2), Level(T3), \ldots Level(Tn), Level(T))$ A predicate symbol consists of a type and level. Associated with each predicate symbol are the specified arguments and the types of the arguments. If a predicate symbol PS has n arguments, then PS is an n-place predicate symbol. If T1, T2, ... are the types of arguments, then the type of the predicate symbol denoted by Type(PS) is $T1 \times T2 \times T3 \times \ldots Tn$. The level of PS (also called the inherent level of PS) is denoted by Level (PS). The following security property must be satisfied:

SP4: $Level(PS) \geq l.u.b. (Level(T1), LevelT2), Level(T3), \ldots Level(Tn))$

Logical connectives A (AND), V(OR), ¬(NOT),→(IMPLICATION).

Quantifiers ∀ (FOR EVERY), ∃ (THERE EXISTS). Quantification is permitted over variables and types.

Terms

A variable symbol is a term. The level and type of the term is the same as those of the corresponding variable symbol.

A constant symbol is a term. The level and type of the term is the same as those of the corresponding constant symbol.

Let F be an n-place function symbol of type $T1 \times T2 \times T3 \times \ldots Tn \rightarrow T$. If t1, t2, t3, ... tn are terms of types T1, T2, T3 .... Tn, respectively, then F(t1, t2, t3 ... tn) is a term type T. Let TE be this term. The level of TE also called the inherent level of TE) is denoted by Level (TE). The following security property must be satisfied:

SP5: $Level(TE) \geq l.u.b.(Level(F), Level(t1), Level(t2), Level(t3), \ldots Level(tn))$ Atomic Formulas If P is a predicate symbol of type $T1 \times T2 \times T3 \ldots Tn$ and t1, t2 t3 ... tn are terms of type T1, T2, T3, ... Tn, respectively, then P(t1, t2, ....tn) is an atomic formula. Let this formula be denoted by AM. The level of AM (also called the inherent level of AM) us denoted by Level(AM). The following security property must be satisfied:

SP6: $Level(AM) \geq l.u.b.(Level(P), Level(t1), Level(t2), Level(t3), \ldots Level(tn))$ Well-Formed Formulas Any atomic formula is a wff.

If W is a wff (whose inherent level is Level(W)), then $\forall x/t(W)$ and $\exists x/t(W)$ are also wffs. The following security property must be satisfied:

SP7: If L1 and L2 are the security levels (or inherent levels) of the formulas $\forall x/t(W)$ and $\exists x/t(W)$ respectively, then Level(W)=L1=L2.

If W1 and W2 are wffs, then ¬W1, W1 ∧ W2, W1 ∨ W2, W1→W2 are also wffs. Further, if L is the least upper bound of the levels Level(W1) and Level(W2) (where Level(W1) and Level(W2) are the inherent levels of W1 and W2, respectively), then the following security property must be satisfied:

SP8: Let W3, W4, W5 and W6 be ¬W1, W1 ∧ W2m/w1 ∨ W2 and W1→W2 respectively. Let L3, L4, L5 and L6 be the security levels (or inherent levels) of the formulas W3, W4, W5 and W6, respectively. Then L3= Level(W1), L4=L5=L6=L.

3.2 NTML Semantics

First we discuss truth assignments to the symbols of NTML, and then we describe interpretations of NTML formulas.

Interpretations of NTML Symbols

We define truth assignments to NTML symbols, types, constants, functions and predicates under an interpretation $\mathfrak{l}$ with respect to a security level L (note that we do not address variable assignment).

Type Symbols: Under and interpretation $\mathfrak{l}$, associated with each type T with inherent level $L^*$, there is a domain $D(T,L)$ for each security level $L \geq L^*$. Further, $D(T,L)$ consists of all elements of type T which satisfy the following conditions:

(a) $L^* \leq Level(x) \leq L$.

(b) $D(T,L') \subseteq D(T,L)$[7] where L' is the security level that is just less than L (that is, them is no security level $L^*$ such that $L'<L^*<L$). We denote $D(T,L)$ to be $\mathfrak{l}(T,L)$.

[7] $\subseteq$ is the subset relationship.

Constant Symbols: Let $\underline{a}$ be a constant symbol of type T. Let Level($\underline{a}$)=L1 and Level(T)=L2 (note that $L2 \leq L1$). Associated with $\underline{a}$ is an element a in $D(T,L)$ for each $L \geq L1$ (note also that for such an element a to exist L1 must be $\leq L$). We denote a by $\mathfrak{l}(\underline{a}, L)$.

Function Symbols: Let F be an n-place function symbol of type $T1 \times T2 \times T3 \times \ldots Tn \rightarrow T$. Let Level(F)=L'. If $L' \leq L$, then associated with F is a mapping $F^*$: $D(T1,L) \times D(T2,L) \times D(T3,L) \times \ldots D(Tn,L) \rightarrow D(T,:)$. We denote $F^*$ by $\mathfrak{l}(f,L)$.

Predicate Symbols: Let P be an n-place predicate symbol of type $T1 \times T2 \times T3 \times \ldots Tn$. Let Level(P)=L'. If $L' \leq L$, then associated with P is a relation $P^*$ on $D(T1,L) \times D(T2,L) \times D(T3,L) \times \ldots D(Tn,L)$ which evaluates to either True or False. We denote $P^*$ by $\mathfrak{l}(P,L)$.

Interpretations of Terms and Formulas

We first define interpretations of variable-free terms with respect to security levels. Next, we define interpretations of variable-free atomic formulas. Finally, we define interpretations of formulas which are either variable-free or closed (note that a formula is closed if it does not have any free variables; a free variable is a variable which is not within the bounds of a quantifier).

Let t be a term and Level(t)=L'. If $L' \leq L$, then the interpretation $\mathfrak{l}$ of t with respect to security level L is denoted by $\mathfrak{l}(t,L)$. We consider the various possibilities for T.

(a) t is the constant symbol $\underline{a}$, then $\mathfrak{l}(t,L)=\mathfrak{l}(\underline{a},L)$.

(b) t is a term $F(t1, t2, \ldots tn)$ where $t1, t2, \ldots tn$ are variable free terms. Then $\mathfrak{l}(t,L)=F^*(t1^*, t2^*, \ldots tn^*)$ where $F^*=\mathfrak{l}(F,L)$, $t1=\mathfrak{l}(t1,L)$, $t2=\mathfrak{l}(t2,L)$, ... $tn=\mathfrak{l}(tn,L)$.

Next we define interpretations of variable-free atomic formulas and formulas which are either variable free or closed.

Let A be the atomic formula with specification $P(t1, t2, \ldots tn)$ where P is a predicate symbol and $t1, t2, \ldots tn$ are variable free terms. Let Level(A)=L'. Then if $L' \leq L$, $\mathfrak{l}(A,L)=P^*(t1^*, \ldots tn^*)$ where $P^*=\mathfrak{l}(P,L)$, $t1^*=\mathfrak{l}(t1,L)$, $t2^*=\mathfrak{l}(t2,L)$, ... $tn^*=\mathfrak{l}(tn,L)$.

Let F and G be variable-free formulas. The interpretation of $\neg F$, $F \wedge G$, $F \vee G$, $F \rightarrow G$ are defined as follows:

$\mathfrak{l}(\neg F, L) = \neg \mathfrak{l}(F, L)$ $\mathfrak{l}(F \wedge G, L) = \mathfrak{l}(F, L) \wedge \mathfrak{l}(G, L)$ $\mathfrak{l}(F \vee G, L) = \mathfrak{l}(F, L) \vee \mathfrak{l}(G, L)$ $\mathfrak{l}(F \rightarrow G, L) =$ False if $\mathfrak{l}(F,L)$=True and $\mathfrak{l}(G,L)$=False=True if otherwise.

Let F be a formula with free variables $x1, x2, \ldots xn$. Let $T1, T2, \ldots Tn$ be the types of $x1, x2, \ldots xn$, respectively. Then, the interpretation of $\forall \underline{x}/\underline{T}(F)$ and $\exists \underline{x}/\underline{T}(F)$ with respect to L (where $\underline{x}$ is the tuple $x1, x2, \ldots xn$ and $\underline{T}$ is the tuple $T1, T2, \ldots Tn$) is defined as follows:

$\mathfrak{l}(\exists \underline{x}/\underline{T}(F), L)$=True if there is an element $(a1, a2, \ldots an)$ which is a member of $D(T1,L) \times D(T2,L) \times \ldots D(Tn,L)$ such that $\mathfrak{l}(F(a1, a2, \ldots an), L)$ evaluates to True. Otherwise $\mathfrak{l}(\exists \underline{x}/\underline{T}(F), L)$ evaluates to False.

$\mathfrak{l}(\forall \underline{x}/\underline{T}(F), L)$=True if for every element $(a1, a2, \ldots an)$ which is a member of $D(T1,L) \times D(T2,L) \times \ldots D(Tn,L)$, $\mathfrak{l}(F(a1, a2, \ldots an), L)$ evaluates to True. Otherwise $\mathfrak{l}(\forall \underline{x}/\underline{T}(F), L)$ evaluates to False.

3.3 NTML Theory

As in any logic theory, an NTML theory has a set of logical axioms, a set of proper axioms, and a set of inference rules. The logical axioms of an NTML theory are analogous to those of first-order logic with equality. These axioms are shown in Table 3.

Every NTML theory has a distinguished type symbol SL. Associated with the distinguished type symbol SL under the interpretation $\mathfrak{l}$ at level L is the domain $D(SL,L)$. $D(SL,L)$ consists of the security levels which are visible to users at level L. For each L, if L1 and L2 are elements of $D(SL,L)$, then either $L1 \leq L2$ or $L2 \leq L1$. Furthermore, the level of the type symbol SL is system-low (which is the lowest security level supported by the system under consideration).

TABLE 3

NTML Theory

Logical Axioms

If A, B, and C are NPML wffs whose inherent security levels are L1, L2, and L3, let the inherent security levels of the variable xi be L4, the term t be L5, the variable x1 be L6, the variable x be L7 and the variable y be L8.
Let L' = l.u.b.(L1, L2, L3), L" = l.u.b.(L1,L2), L* = l.u.b.(L1,L4,L5), L+ = l.u.b.(L1,L2,L4), L^ = l.u.b.(L1,L7,L8)
Then, the following are the logical axioms of an NPML theory:
A1:  $(A \rightarrow (B \rightarrow A))$, L"
A2:  $((A \rightarrow (B \rightarrow C)) \rightarrow ((A \rightarrow B) \rightarrow (A \rightarrow C)))$, L'
A3:  $((\neg B \rightarrow \neg A) \rightarrow ((\neg B \rightarrow A) \rightarrow B))$, L"
A4:  $(\forall xi/Ti\ A(xi) \rightarrow A(t))$, L* where t is a term free for xi in A(xi)
A5:  $(\forall xi/Ti\ (A \rightarrow B) \rightarrow (A \rightarrow \forall xi/Ti\ B))$, L+ if A is a wff containing no free occurrences of xi
A6:  $(\forall x1/T1\ xi = x1) < L6$
A7:  $(x = y \rightarrow (A(x,x) \rightarrow A(x,y)))$, L^

TABLE 3-continued

NTML Theory

Part of the Proper Axioms (Dominate(Secret, Unclassified)), Unclassified
(Dominate(TopSecret, Secret)), Unclassified
($\forall$L1,L2,L3 ESL (Dominate(L1,L2) $\land$ Dominate(L2,L3) $\rightarrow$ Dominate(L1,L3))), Unclassified
($\forall$L1,L2 ESL (Dominate(L1,L2) $\forall \neg \quad \exists$L3 (L3 $\neq$ L1 $\land$ L3 $\neq$ L2 $\land$ Dominate(L1,L3) $\land$Dominate(L3,L2)) $\rightarrow$ Just-less-than (L2,L1)), Unclassified Rules of Inference MP: (Q,L) is a direct consequence of (P,L) and (P $\rightarrow$ Q,L)
GEN: ($\forall$x/T(P),L) is a direct consequence of (P,L)
DASL: (P,L2) is a direct consequence of (P,L!), Just-less-than (L1,L2) and $\neg \quad (\neg \quad ,$P,L2)

Every NTML theory has a set of constant symbols for every security level considered. Each constant is of type SL. Two predicate symbols "Dominate" and "Just-less-than" (both having security level system-low) are defined on the variable and constant symbols of type SL. For examples, let D(SL, Unclassified)—{Unclassified, Secret, and Top Secret}. Let the distinguished individual constants be Unclassified, Secret, and Top Secret whose assignments are the levels Unclassified, Secret, and Top Secret respectively. Then, Table 3 shows part of the proper axioms of the theory.

Next to each formula we state a security level. This is the level at

Note (a) Next to each formula we state a security level. This is the level at which the formula is true under all interpretations. If we do not specify a security level next to a formula, then the formula is assumed to be true with respect to all security levels under all interpretations (see the ensuing discussion of the proper axioms).

(b) For convenience we refer to the constants Unclassified, Secret, and Top Secret by their respective assignments Unclassified, Secret, and Top Secret.

The remaining proper axioms of an NTML theory are constructed from a subset of the NTML formulas, as follows:

Let {W1, W2, ... Wn} be a subset of NTML formulas. Let L1, L2, ... Ln be the (inherent) security levels of W1, W2, ... Wn respectively. Wi is explicitly asserted to be a proper axiom of an NTML theory at level L, which is denoted by (Wi,L), if (a) Li$\leq$L.

(b) Wi is true in all interpretations $\lfloor$with respect to L.

That is, $\lfloor$(Wi,L) is true for all interpretations $\rfloor$.

(c) It is not the case that (Wi,L*) is an axiom where L* is just less than L.

Note that if L is just less than L+ and if Wi is not true with respect to L+, then $\neg$WI,L+) is a proper axiom of the theory. We assume that a set of proper axioms with respect to any security level is consistent. That is, the formulas (P,L), (P$\rightarrow$$\neg$Q,L) and (Q,L) cannot be the proper axioms of a theory for any security level L.

Note that in the discussion on the syntax of NTML, each formula was assigned a security level. This level is the inherent security level of the formula. For example, in the database context the inherent security level of a formula is the security level of the schema which is represented by that formula. So, if (W,L) is a proper axiom of an NTML theory and if the inherent security level of W is L*, then the following security property must be satisfied:

SP9: L*$\leq$L

Note (a) In the database context, this means that the security level of the schema must be dominated by the security level of any tuple in the corresponding relation.

(b) The security properties SP1 to SP9 that we have described are not part of the NTML theory. They can be regarded as axioms of a metatheory. That is, the security properties are enforced within the metatheory. This point will be addressed in section 6.

(c) Each formula which is an axiom is followed by a security level. This is the level with respect to which formula is true under all interpretations. If no level is specified, then the formula is true with respect to all security levels under all interpretations.

The rules of inference of an NTML theory are Modus Ponens (MP), Generalization (GEN) and Deductions Across Security Levels (DASL). These rules are also shown in Table 3. The rule DASL is needed for a multilevel environment.

One can define theorems of an NTML theory as in any other logic. For example, (F,L) is denoted a theorem of the NTML theory T if either (F,L) is an axiom of T or (F,L) can be derived from the axioms using the rules of inference. That is, there exists a derivation (P1,L1), (P2,L2) ... (Pn,Ln) such that (Pn, Ln)=(F,L) and for each i (1$\leq$i$\leq$n) Li$\leq$L, each (Pi,Li) is either an axiom of T or it can be derived from (P1,L1), (P2,L2) ... (Pi–1,Li–1) from the rules of inference.

Note (a) Like an axiom, a theorem is also followed by a security level.

(b) In the case of a formula which is either an atom or the negation of an atom, we include the security level as an argument for convenience. For example, (P(t1, t2, ... tn),L) and $\neg$P(t1, t2, ... tn), L) are denoted by (P(t1, t2, ... tn, L)) and $\neg$P(t1, t2, ... tn, L)), respectively.

One can define consistency, soundness, and completeness of an NTML theory as follows. An NTML theory is consistent if there is not a wff F and a security level L such that (F,L) and $\neg$F,L) are its theorems. An NTML theory is sound if for every theorem (F,L), F evaluates to true with respect to L. An NTML theory is complete if for every wff F and security level L, if F evaluates to true with respect to L, the (F,L) is a theorem.

We have the following theorems that show the consistency, soundness, and completeness of an NTML theory.

Theorem 2

An NTML Theory is Consistent.

Proof of Theorem 2: The proof of this theorem uses a technique similar to the proof of the consistency of first-order logic. We refer the reader to Mendleson, E. 1979, *Introduction to Mathematical Logic,* Princeton, N.J.: Van Nostrand (see proposition 2.2, page 62) for the proof of the consistency of first-order logic.

Theorem 3

An NTML Theory is Sound.

Proof of Theorem 3: This proof follows from the proofs of the following lemma. The proof of this lemma uses techniques similar to the proof of the soundness of first-order logic given in Mendleson, E. 1979, *Introduction to Mathematical Logic,* Princeton, N.J.: Van Nostrand (see propositions 2.1–2.7, pages 61–65).

Lemma 4

(a) If P and P→Q are NTML wffs which are true under an interpretation ⌐ with respect to L, then so is Q.

(b) If the NTML formula P is true under an interpretation ⌐ with respect to L, then so is "$\underline{x/T}$(P).

(c) If the NTML formula P is true under an interpretation ⌐ with respect to L1 and just-less-than (L1,L2) is true under ⌐ with respect to all security levels, and it is not the case that ⌐P) is true under ⌐ with respect to L2, the P is true under ⌐ with respect to L2.

Theorem 5

An NTML Theory is Complete.

Proof of Theorem 5: The proof of this theorem uses techniques similar to the proof of the completeness of first order predicate calculus (see Mendleson, E. 1979, *Introduction to Mathematical Logic,* Princeton, N.J.: Van Nostrand, see proposition 2.13, page 69).

Section 4

Viewing Multilevel Databases Through NTML

In this section we provide an overview of the perceived multilevel universe and then describe three approaches to represent it, based on NTML. This work follows from the work reported in Nicolas, J., and H. Gallaire, (Editors: H. Gallaire and J. Minker), 1978, *Database: Theory vs Interpretation,* New York: Plenum Press, where the first-order logic is used to formalize nonmultilevel databases.

4.1 Multilevel Universe

A state of the universe can be regarded as a set of elements linked together by functions or relations. Since functions can be regarded as special kinds of relations, we only consider relations in our discussion. We distinguish between the actual universe and the perceived universe. The actual universe is the real universe. The perceived universe is the part of the universe that is involved in the particular application under consideration. We refer to the perceived universe as the universe.

Since elements and relations are all assigned security levels, the universe is multilevel. One can partition this universe into worlds corresponding to each security level. The worlds are the views of the universe by users at corresponding levels. For example, a Secret world in the universe is the world perceived by those cleared at the Secret level.

Information in a multilevel universe is the knowledge of the truth value of a statement with respect to some security level. A statement could be an elementary fact such as "John's salary is 30K,"[8] it could be a schema such as, "The attributes of employee are SS#, name and salary," or it could be a law such as, "All salary values must be positive." The statement, "John's salary is 30K," could be true with respect to the Unclassified level, and it could be false with respect to the Secret level. Therefore, in the Unclassified world, "John's salary is 30K" represents true information while in the Secret world "John's salary is 30K" represents false information.

[8] By elementary fact, we mean a relation applied to the elements of the universe.

The elementary facts, the schema and the laws are only a subset of the information of the perceived universe. This is known as explicit information. The other kind of information is implicit information which is the information derived from the explicit information.

Note (a) A general law is in fact an integrity constraint. We use the terms general law and integrity constraint interchangeably.

(b) Security constraints that assign security levels to the data can also be regarded as general laws, (i.e., security constraints are also integrity constraints).

(c) A general law can either be an integrity rule or a derivation rule. An integrity rule must be satisfied by the database. A derivation rule is used to derive new information from the database data and any real-world information.

Representing negative information has been a subject of much research. Negative information can also be either explicitly or implicitly specified. For example, the statement, "It is not the case that John's salary is 60K," explicitly states that John's salary is not 60K.

Implicit representation of negative information can be derived by using certain rules. These rules include the rules of inference associated with the theory as well as other rules of inference such as the uniqueness axiom and the completeness axiom. For example, if there is a rule that "John's salary is unique" and a fact that "John's salary is not 30K," then one could deduce the negative information that "John's salary is not 60K." Completeness axioms specify all the values that a particular entity can take. For example, from the following axiom, "John's salary is either 30K or 60K," one can deduce that John's salary is not 50K.

A multilevel universe can either be finite or infinite depending on whether the elements associated with it are finite or infinite. Further, one can regard a universe to be either open or closed. If the universe is closed, then any fact that does not evaluate to true in the universe is assumed to be false and its negation is assumed to be true. If it is an open universe, then such an assumption is not made. That is, one cannot assume negative information unless it is explicitly stated or one can deduce it.

In the next three subsections, we describe three approaches to representing the perceived universe. All approaches use NTML Logic as a framework.

4.2 Perceived Multilevel Universe as an NTML Theory

In this approach, called the proof theoretic approach, the perceived multilevel universe is represented as a NTML theory. The NTML theory is defined as follows:

Its constants and predicates are respectively the elements and relations associated with the universe.

Its proper axioms are defined as follows: If an elementary fact, schema, or a general law is true in all interpretations with respect to a security level L, and it is not the case that this fact or law is true in all interpretations with respect to the security level L* where L* is just less than L, then the fact or law is assigned the security level L and is taken to be a proper axiom of the theory.

If it is not the case that an elementary fact, schema, or law is true in all interpretations with respect to a security level L, and this fact or law is true in all interpretations with respect to a security level L* where L* is just less than L, then the negation of this fact or law is either taken to be a proper axiom of the theory, or one should be able to derive the negation from the proper axioms.

The implicit information is the theorems of the NTML theory. The actual multilevel universe is an interpretation of the NTML theory. Whether the actual universe is a model of the theory depends on how accurately the actual universe fits the perceived universe. The approach is illustrated in FIG. 1.

Query Evaluation A query posed by a user at security level L is expressed as a wff of the NTML theory. There are two types of queries: closed and open. A closed query is a wff which is closed (i.e., with no free variables), and an open query is one with at least one free variable. Query evaluation amounts to theorem proving. For example, let W be the wff which corresponds to a query Q posed by a user at level L. Then evaluating the query Q amounts to proving that (W,L) is a theorem of the NTML theory.[9]

[9] It should be noted that proof procedures for NTML logic are yet to be developed. For the discussion given in this section we assume that the NTML rules of inference are used for deductions.

For example, let A and B be the wffs which correspond to the respective queries Q1 and Q2. Further assume that Q1 is closed and Q2 is open and that the queries are posed by a user at level L. The solution to Q1 is a Yes or No answer. The answer is Yes if (A,L) is a theorem of the NTML theory. For the open query Q2, a tuple in the response is obtained as follows: Substitute appropriate elements associated with the NTML theory for the free variables of B. Let the resulting wff be B*. If (B*,L) is a theorem of the theory, then the tuple which is formed from the elements substituted to form B* is included in the response.

We illustrate both open and closed query evaluation associated with this first approach with examples. We assume that there are only two security levels: Secret and Unclassified. The Secret level dominates the Unclassified level.

The proper axioms of the NTML theory are shown in Table 4. PA1 and PA2 are schemas for the relations EMP and SEN-EMP, respectively. Both schemas have the Unclassified level associated with them as they are both true at the Unclassified level. PA1 states that if EMP(X,Y,Z) is true in an interpretation with respect to L, then the types of X, Y, and Z are SS#, NAME and SALARY, respectively. Note that since EMP(X,Y,Z) is an atomic formula, we include the level L as one of its arguments. PA2 states that if SEN-EMP(X) is true under an interpretation with respect to L, then the type of X is NAME.

PA3, PA4, and PA5 are atomic formulas with no variables. So are the axioms PA11–PA14. Although it is not explicitly specified, axioms PA6–PA9 assume universal quantification over all variables X, Y, Z, L (with or without subscripts). PA6 is a law which defines all those who earn more than 30K or more as senior employees. PA7 is a law which states that all salaries must be less than or equal to 40K. This law is true only with respect to the Unclassified level. Note that PA10 negates this law at the Secret level. PA8 is the equivalent to the primary key constraint in relational databases. PA9 states that if two tuples exist with the same SS# at different security levels, then the negation of the tuple at the lower security level is true with respect to the higher level.

Queries are expressed as formulas of NTML theories at the level of the user who posed the queries. Consider the following queries:

Q1: EMP(000, John, 20K), Unclassified
Q2: EMP(111, James, 60K), Unclassified
Q3: ∃ X EMP(X,Y,Z), Unclassified
Q4: EMP(000, John, 20K), Secret
Q5: EMP(111, James, 35K), Secret The five queries are expressed as formulas of NTML whose proper axioms are given in Table 4. Query evaluation amounts to theorem proving. Note that the queries Q1, Q2, Q4, and Q5 are closed queries while Q3 is open. Also, the queries Q4 and Q5 are posed by Secret users while Q1, Q2, and Q3 are posed by Unclassified users.

An attempt to prove that (EMP(000, John, 20K), Unclassified) is a theorem of NTML will be successful as PA3 is a proper axiom of the theory. Therefore, the answer to query Q1 is "Yes."

For the query Q2, since its negation (i.e., ¬EMP(111, James, 60K), Unclassified) can be proved to be a theorem of NTML, the answer is "No."

The answer to query Q3 consists of all the (Y,Z) pairs such that there is some X for which (EMP(X, Y, Z), Unclassified) is a theorem of NTML. From the axioms it can be seen that the answer to Q3 is the set of pairs {(John, 20K), (James, 35K), (Mary, 15K)}.

The answer to the query Q4 is, "No." This is because from the axioms PA3, PA9, and PA11, it can be deduced that ¬EMP(000, James, 20K), Secret) is a theorem.

The answer to the query Q5 is "Yes" as it can be derived from the axiom PA4 and the rule of inference DASL.

TABLE 4

Database as an NTML Theory

| | |
|---|---|
| PA1: | (∀X/T1, Y/T2, Z/T3, L/SL EMP(X,Y,Z,L) → T1 = SS# ∧ T2 = NAME ∧ T3 = SALARY), Unclassified |
| PA2: | (∀X/T, L/SL SEN-EMP(X,L) → T = NAME), Unclassified |
| PA3: | → EMP(000, John, 20K, Unclassified) |
| PA4: | → EMP(111, James, 35K, Unclassified) |
| PA5: | → EMP(222, Mary, 15K, Unclassified) |
| PA6: | (EMP(X,Y,Z,Unclassified) ∧ Z ≥ 30K → SEN-EMP(Y, Unclassified)), Unclassified |
| PA7: | (EMP(X,Y,Z,Unclassified) → Z ≤ 40K), Unclassified |
| PA8: | (EMP(X, Y1, Z1, L), ∧ EMP(X, Y2, Z2, L) Y1 = Y2 ∧ Z1 = Z2), Unclassified |
| PA9: | (EMP(X, Y1, Z1, L1) EMP(X, Y2, Z2, L2) ¬ (Y1 = Y2 ∧ Z1 = Z2) Just-less-than(L1, L2) →¬ EMP(X,Y1,Z1,L2)), Unclassified |
| PA10: | ¬ (∀X/SS#, Y/NAME, Z/SALARY, L/SL (EMP(X,Y,Z,L) → Z ≤ 40K)), Secret |
| PA11: | → EMP(000, John, 50K, Secret) |
| PA12: | → SEN-EMP (George, Secret) |
| PA13: | → SEN-EMP (Harry, Unclassified) |
| PA14: | → SEN(333, Jane, 70K, Secret) |

Advantages and Drawbacks

This approach permits disjunctive information to be represented. For example, one can express the information that "either the salary of John is less than 50K or John is a senior employee." However, this approach does have certain drawbacks. One is that in the database context, the elementary facts that have to be represented may be very large. Therefore, efficient proof techniques have to be developed to handle the large amounts of facts and rules. Furthermore, negative information in this approach has to be explicitly stated. This makes the database even larger.

Another drawback to this approach is the verification of the general laws. That is, the general laws are treated as derivation rules with this approach. That is, they are not treated as integrity rules where they could be validated during database updates. By treating the general laws as derivation rules, each time some information is added at a security level L, the proper axioms of the NTML theory may have to be modified. As a result, a new NTML theory is produced. Therefore, the consistency of the new theory has to be checked. If the new theory is inconsistent, then appropriate actions have to be taken. Possible ways to handle exceptions are:

(a) Do not permit the update.

(b) Modify the axioms so that consistency is maintained.

(c) Adopt the technique proposed in Kowalski, R. A. (Editors: H. Gallaire and J. Minker), 1978, "Logic for Data Description," *Logic and Databases,* New York: Plenum Press, where a new predicate INCONSISTENT is added to the NTML theory. This new predicate handles the exceptional situations.

4.3 Multilevel Database as a Model

Figure 2:
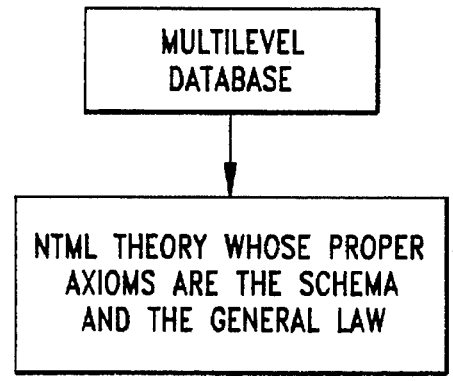
FIG. 2 is a block diagram illustrating a multilevel database as a model of NTML theory.
Figure 3:
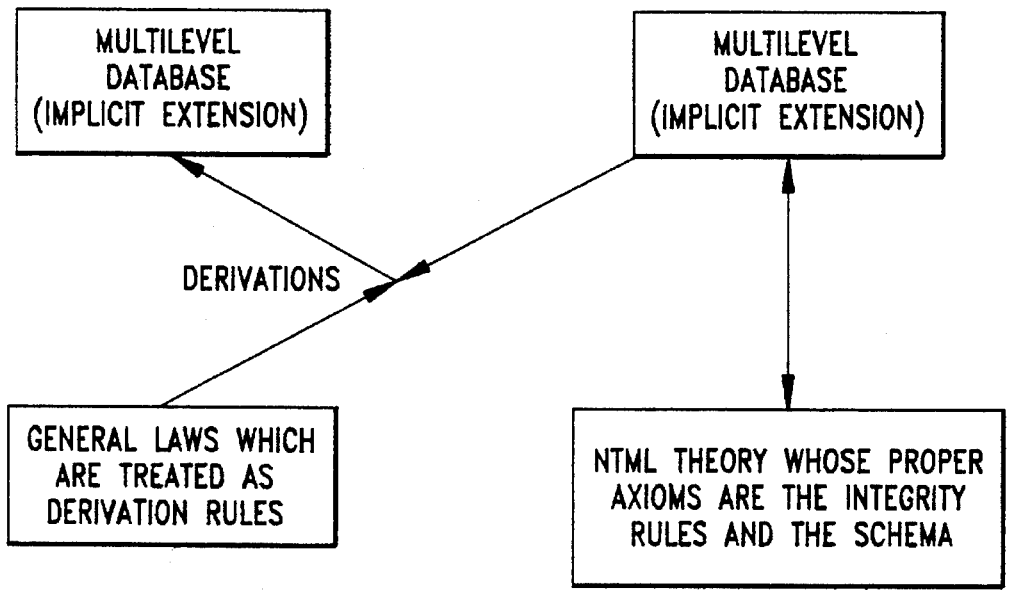
FIG. 3 is a block diagram illustrating general laws as integrity rules and derivation rules.

In the second approach, called the model theoretic approach, the set of elementary information is considered to be an interpretation of an NTML theory. This is the approach that is implicitly followed in a traditional relational database system. The proper axioms of the NTML theory are the general laws. All general laws are used as integrity rules and not as derivation rules. That is, since certain general laws are the proper axioms of an NTML theory these laws must be satisfied by the multilevel database. The approach is illustrated in FIG. 2.

Query Evaluation

Query evaluation in this approach amounts to checking the satisfiability of the formulas which represent the multilevel database. That is, for a closed query posed by a user at level L, the truth or falsity of the corresponding formula is checked against the portion of the multilevel database visible at security level L. For an open query at level L, the set of values associated with the database at level L which satisfies the formula, when substituted for the free variables, will form the response.

We illustrate both open and closed query evaluation associated with this second approach with examples.

Consider the multilevel database shown in Table 5. The schema S1, S2, and the general laws IR1–IR5, expressed as NTML formulas, are treated as integrity rules. That is, whenever the database is updated, the integrity rules must be satisfied. For example, whenever a name is included in the relation SEN-EMP, it must be first verified that the name is an employee and that the corresponding salary is greater than or equal to 30K. Also, whenever an Unclassified tuple is modified or entered into the database, the salary value specified must be less than or equal to 40K. IR3 is the primary key constraint. Also note that all the variables in IR1–IR3 are implicitly assumed to be universally quantified. IR1 is negated at the Secret level in IR4 as IR1 does not hold at the Secret level. For the laws IR2 and IR3, we do not duplicate them at the Secret level. This is because all of the laws are axioms of an NTML theory and therefore the NTML rules of inference can be used to deduce new laws at the Secret level. For example, from IR2 and the rule DASL, we have the following law:

(EMP(X,Y,Z,L) $\wedge$ Z≧30K→SEN-EMP(Y,L)), Secret.

IR5 is the integrity rule which ensures that tuples are duplicated at the appropriate levels.[10] It should also be noted that since the integrity rules and the schemas are axioms of an NTML theory, the rules of inference could be used to deduce new laws. IR5 states that if there is a tuple in the database at level L1, and if a second tuple in the database with the same primary key as the first one does not exist at a level L2 where L1 is just less than L2, then the first tuple in the database must also exist at level L2. Note that although IR5 is classified at the Unclassified level, the rule DASL will ensure that it is valid at all security levels.

[10] Note that, in this approach, NTML rules of inference cannot be used to infer new tuples.

TABLE 5

Multilevel Database as a Model

S1: ($_\forall$X/T1, Y/T2, ZT3, L/SL EMP(X,Y,Z,L) →
    T1 = SS#$_\wedge$T2 = NAME$_\wedge$T3 = SALARY), Unclassified
S2: ($_\forall$X/T, L/SL SEN-EMP(X,L) → T = NAME), Unclassified
IR1: (EMP(X,Y,ZL) → Z ≧ 40K), Unclassified
IR2: EMP(X,Y,Z,L) $_\wedge$Z ≧ 30K → SEN-EMP(X), Unclassified
IR3: (EMP(X,Y1,Z1,L)$_\wedge$EMP(X,Y2,Z2,L) →
    Y1 = Y2$_\wedge$Z1 = Z2), Unclassified
IR4: ¬ ($_\forall$X/SS#, Y/NAME, Z/SALARY, L/SL (EMP(X,Y,Z,L) →Z ≦ 40K)), Secret
IR5: ($_\forall$X1/SS#, Y1/NAME, Z1/SALARY, L1/SL, L2/SL (EMP(X1,Y1,Z1,L1)$^\wedge$
    ¬ $_\exists$Y2/NAME, Z2/SALARY (EMP(X1,Y2,Z2,L2)$_\wedge$(Y1 ≠ Y2 V Z1 ≠ Z2))
    $^\wedge$Just-less-than(L1, L2) → EMP(XI, Y1, Z1, L2))), Unclassified Relation: EMP

| SS# | Name | Salary | Level |
|---|---|---|---|
| 000 | John | 20K | Unclassified |
| 111 | James | 35K | Unclassified |
| 222 | Mary | 15K | Unclassified |
| 000 | John | 50K | Secret |
| 111 | James | 35K | Secret |
| 222 | Mary | 15K | Secret |
| 333 | Jane | 70K | Secret |

Relation: SEN-EMP

| Name | Level |
|---|---|
| James | Unclassified |
| John | Secret |
| Jane | Secret |

We are, however, faced with the problem of finding a mechanism to enforce IR5. For example, consider the situation where the tuple (444, Paul, 30K, Unclassified) is added to the database. All of the integrity rules are satisfied at the Unclassified level and, therefore, the multilevel database is a model of the axioms at this level. However, at the Secret level, the Secret counterpart to IR5 (obtained via DASL) is not satisfied if (444, Paul, 30K, Secret) is not the database. Possible solutions to this problem are:

(a) Reject the update if (444, Paul, 30K, Secret) is not in the database; this has a problem in terms of security. That is, if an Unclassified user has requested the update (which will usually be the case), then by rejecting the update this user will know that the tuple does not exist at the higher level since he can read IR5.

(b) Enter the tuple (444, Paul, 30K, Secret) into the database. The level of the subject (who acts on behalf of the user) who attempts this update will be determined by the Security Policy enforced by the system (usually this subject will operate at the Secret level).

(c) Permit the update, but use the predicate INCONSISTENT (as described in Kowalski, R. A. (Editors: H. Gallaire and J. Minker), 1978, "Logic for Data Description," *Logic and Databases,* New York: Plenum Press to handle the exceptional situation. That is, some additional laws are introduced at the Secret level in order to handle the exceptional situations (note that if the laws are updated, then a new theory is obtained, which means the consistency of the new theory has to be checked).

Next we describe query evaluation with this approach. Consider the following queries posed by a Secret user.

Q6: EMP(000, John, 20K)

Q7: EMP(000, John, 60K)

Q8: SEN-EMP(X)

Note that Q6 and Q7 are open queries while Q8 is a closed query. The answer to Q6 is "No" at the tuple (000, John, 20K, Secret) is not specified in the database. The answer to Q7 is "Yes" as the tuple (000, John, 60K, Secret) is specified in the database. The answer to the query Q8 is the set (John, Jane, James).

Advantages and Drawbacks

By treating all the general laws as integrity rules, the NTML theory does not change unless the general laws themselves evolve. Also negative information does not have to be explicitly specified. Anything that is not specified in the database is assumed to be false.

A drawback with this approach is that tuples have to be duplicated at different security levels. This is because none of the general laws are used as derivation rules and, therefore, new tuples cannot be deduced from existing tuples. Therefore, one cannot deduce that (111, James, 35K, Secret) from (111, James, 35K, Unclassified). Therefore, the tuple (111, James, 35K, Secret) has to be explicitly specified in the database (see the discussion on the rule IR5 given earlier).

When data is inserted, deleted or modified, the interpretation is also changing. Therefore, one has to verify that the new interpretation is still a model of the NTML theory. That is, when there is some change made by a user at level L, then it has to be ensured that at all security levels L* (L*$\geq$L), the multilevel database is still a model of the theory. In general, it is not necessary to verify each law when the database is updated. That is, only certain laws may be falsified as a result of the update. It remains to be investigated as to whether the techniques developed for integrity checking in relational databases (see, for example, the work in Nicolas, J., and K. Yazdania, (Editors: H. Gallaire and J. Minker), 1978, "Integrity Checking in Deductive Databases," *Logic and Databases,* New York: Plenum Press; Nicolas, J., "Logic for Improved Integrity Checking in Relational Databases," 1982, *Acta Informatica,* Vol. 18, No. 3, pp. 227–253) can be adapted for multilevel databases.[11]

[11] Integrity constraints are discussed in section 7.

4.4 Integrated Approach

This approach is a mixture of the two previous approaches for handling the general laws. That is, some of the general laws are taken as integrity rules and the others as derivation rules. The database has two components. One is the explicit extension which is a model of an NTML theory whose proper axioms are the general laws which are regarded as integrity vales. The other is the implicit extension which is the set of all tuples which are derived from the explicit extension by virtue of the general laws which are used as derivation rules.

Query Evaluation

Query evaluation at a level L depends on whether relations are defined explicitly or implicitly. Two ways to treat relation definitions have been identified. They are as follows:

(a) A Relation is either defined explicitly or implicitly. If it is defined implicitly, then it is defined in terms of the explicit relations. Note that each definition is a NTML formula and therefore has a security level attached to it. When a query is posed at level L, all references to implicit relations in the query formula are replaced by explicit relations according to the definitions of the implicit relations at level L. The modified query is evaluated against the explicit extension of the multilevel database. Note that the treatment of views in relational database systems takes this approach.

(b) In the second approach, it is not necessarily the case that a relation is defined either implicitly or explicitly. That is, it is impossible for part of the relation to be defined explicitly and part of it implicitly. Therefore, evaluating a query at level L amounts to deducing facts which are tuples at level L. That is, evaluating a query R(x1, x2, x3 . . . xn), expressed by (R(x1, x2, . . . xn), L), amounts to obtaining all proofs of the formula ($\exists$ x1/t1, x2/t2, . . . xn/tn R(x1, x2, . . . xn), L).

An advantage of the second treatment of relation definition is that in the real world one could know various relationships without having to know exactly how these relationships were formed. That is, it is possible for people to be senior employees without actually having to make a salary of more than 30K.

We illustrate query evaluation with an example:

Suppose a Secret user poses a query to retrieve all senior employees. This query is expressed by the NTML formula:

SEN-EMP(X), Secret.

If the relation SEN-EMP is defined only explicitly (see Table 6), the answer to the query will be the names {John, Jill}. (Note that in Table 6, S1 and S2 are the schema rules, DR1 is a derivation rule which defines JUN-EMP, and IR1 and IR2 are integrity rules.)

If the relation SEN-EMP is defined only implicitly (Table 7), the query is then modified to the following formula:

($\exists$ X,Z EMP(X,Y,Z)$\wedge$ Z>30K, Level=Secret).

The answer to the query is the set {John, James, Jane}. (Note that in Table 7, S1 is a schema rule, DR1 is a derivation rule which defines SEN-EMP, and IR1–IR4 are integrity rules.)

If, however, a relation could be defined explicitly as well as implicitly (see table 8), then the answer to the query is the set {John, James, Jane, Jill}. (Note that in table 8, S1 and S2 are schema rules, DR1 is a derivation rule, and IR1–IR4 are integrity rules.)

Advantages and Drawbacks

By using some of the general laws as derivation rules, not all of the information has to be made explicit. This could save storage space. Also, with this approach it is possible to express general information about the perceived world without having to split it into sets of elementary information.

Examining Tables 6, 7, and 8 we see that by implicitly defining the relation SEN-EMP, certain tuples need not be explicitly expressed in the database. This could save storage space. As another example, consider the integrity rule IR2 expressed in Table 6 (note that this is in fact the rule IR5 in Table 5). This rule ensures that tuples are duplicated at different security levels. In the third approach, such duplication can be eliminated by using this rule as a derivation rule as given in Table 9. Note that the derivation rule is in fact the inference rule DASL. However, this rule has to be explicitly stated if new tuples are to be deduced from existing tuples. By using IR2 in Table 6 as a derivation rule as shown in Table 9, some tuples in the relation EMP need not be explicitly specified.

TABLE 6

Relation Defined Explicitly

S1: $(\forall X/T1, Y/T2, Z/T3, L/SL\ EMP(X,Y,Z,L) \rightarrow$
$T1 = SS\#\ _\wedge T2 = NAME\ _\wedge T3 = SALARY)$, Unclassified
S2: $(\forall X/T, L/SL\ SEN\text{-}EMP(X,L) \rightarrow T = NAME)$, Unclassified
DR1: $(EMP(X,Y,Z,L)_\wedge Z < 20K \rightarrow JUN\text{-}EMP(Y,L))$, Unclassified
IR1: $(EMP(X,1,Z1,L)_\wedge EMP(X,Y2,Z2,L) \rightarrow$
$Y1 = Y2_\wedge Z1 = Z2)$, Unclassified
IR2: $(\forall X1/SS\#,Y1/NAME,Z1/SALARY,L1/SL,L2/SL\ (EMP(X1,Y1,Z1,L1)^\wedge$
$\neg\ \exists Y2/NAME, Z2/SALARY\ (EMP(X1,Y2,Z2,L2)\ ^\wedge(Y1 \neq Y2\ V\ Z1 \neq Z2))$
$_\wedge Just\text{-}less\text{-}than(L1, L2) \rightarrow EMP(X1, Y1, Z1, L2)))$, Unclassified Relation: EMP

| SS# | Name | Salary | Level |
|---|---|---|---|
| 000 | John | 20K | Unclassified |
| 111 | James | 35K | Unclassified |
| 222 | Mary | 15K | Unclassified |
| 000 | John | 50K | Secret |
| 111 | James | 35K | Secret |
| 222 | Mary | 15K | Secret |
| 333 | Jane | 70K | Secret |

Relation: SEN-EMP

| Name | Level |
|---|---|
| Jill | Unclassified |
| John | Secret |
| David | Secret |

TABLE 7

Relation Defined Implicitly

S1: $(\forall X/T1, Y/T2, Z/T3, L/SL\ EMP(X,Y,Z,L) \rightarrow$
$T1 = SS\#\ _\wedge T2 = NAME\ _\wedge T3 = SALARY)$, Unclassified
DR1: $(EMP(X,Y,Z,L)_\wedge Z \geq 30K \rightarrow SEN\text{-}EMP(X,L))$, Unclassified
IR1: $EMP(X,Y,Z) \rightarrow Z \geq 40K$, Unclassified

TABLE 7-continued

Relation Defined Implicitly

IR2: $(EMP(X,Y1,Z1,L) \wedge EMP(X,Y2,Z2,L) \rightarrow$
$Y1 = Y2 \wedge Z1 = Z2)$, Unclassified IR3: $(\neg(\forall X/SS\#, Y/NAME, Z/SALARY, L/SL (EMP(X,Y,Z,L) \rightarrow$
$Z \geq 40K)$, Secret IR4: $(\forall X1/SS\#, Y1/NAME,Z1/SALARY,L1/SL,L2/SL (EMP(X1,Y1,Z1,L1)^\wedge$
$\neg_\exists Y2/NAME, Z2/SALARY (EMP(X1,Y2,Z2,L2) \wedge (Y1 \neq Y2 \vee Z1 \neq Z2))$
$^\wedge$Just-less-than $(L1, L2) \rightarrow EMP(X1,Y1,Z1,L2)))$, Unclassified

Relation: EMP

| SS# | Name | Salary | Level |
|---|---|---|---|
| 000 | John | 20K | Unclassified |
| 111 | James | 35K | Unclassified |
| 222 | Mary | 15K | Unclassified |
| 000 | John | 50K | Secret |
| 111 | James | 35K | Secret |
| 222 | Mary | 15K | Secret |
| 333 | Jane | 70K | Secret |

TABLE 8

Relation Defined Explicitly and Implicitly

S1: $(\forall X/T1,Y/T2,Z/T3,L/SL EMP(X,Y,Z,L) \rightarrow$
$T1 = SS\# \wedge T2 = NAME \wedge T3 = SALARY)$, Unclassified S2: $(\forall X/T,L/SL SEN-EMP(X,L) \rightarrow T = NAME)$, Unclassified DR1: $(EMP(X,Y,Z,L) \wedge Z \geq 30K \rightarrow SEN-EMP(X,L))$, Unclassified IR1: $EMP(X,Y,Z,L) \rightarrow Z \geq 40K$, Unclassified IR2: $(EMP(X,Y1,Z1,L) \wedge EMP(X,Y2,Z2,L) \rightarrow$
$Y1 = Y2 \wedge Z1 = Z2)$, Unclassified IR3: $(\neg(\forall X/SS\#, Y/NAME, Z/SALARY, L/SL (EMP(X,Y,Z,L) \rightarrow$
$Z \geq 40K)$, Secret IR5: $(\forall X1/SS\#, Y1/NAME,Z1/SALARY,L1/SL,L2/SL (EMP(X1,Y1,Z1,L1)_\wedge$
$\neg_\exists Y2/NAME,Z2/SALARY (EMP (X1,Y2,Z2,L2) \wedge (Y1 \neq Y2 \vee Z1 \neq Z2))$
$\wedge$ Just-less-than$(L1,L2) \rightarrow EMP(X1,Y1,Z1,L2)))$, Unclassified

Relation: EMP

| SS# | Name | Salary | Level |
|---|---|---|---|
| 000 | John | 20K | Unclassified |
| 111 | James | 35K | Unclassified |
| 222 | Mary | 15K | Unclassified |
| 000 | John | 50K | Secret |
| 111 | James | 35K | Secret |
| 222 | Mary | 15K | Secret |
| 333 | Jane | 70K | Secret |

Relation: SEN-EMP

| Name | Level |
|---|---|
| Jill | Unclassified |
| John | Secret |
| David | Secret |

TABLE 9

Eliminating Duplication Across Security Levels

S1: $(\forall X/T1,Y/T2,Z/T3,L/SL EMP(X,Y,Z,L) \rightarrow$
$T1 = SS\# \wedge T2 = NAME \wedge T3 = SALARY$, Unclassified S2: $(\forall X/T,L/SL SEN-EMP(X,L) \rightarrow T = NAME)$, Unclassified DR1: $(EMP(X,Y,Z,L) \wedge Z < 20K \rightarrow JUN-EMP(Y,L))$,Unclassified DR2: $(\forall X1/SS\#, Y1/NAME,Z1/SALARY,L1/SL,L2/SL (EMP(X1,Y1,Z1,L1)^\wedge$

TABLE 9-continued

Eliminating Duplication Across Security Levels $\neg_\exists$Y2/NAME, Z2/SALARY (EMP(X1,Y2,Z2,L2)$_\wedge$Y1 ≠ Y2 V Z1 ≠ Z2))
$\wedge$ Just-less-than(L1,L2) → EMP(X1,Y1,Z1,L2))), Unclassified
IR1: (EMP(X,Y1,Z1,L) $_\wedge$ EMP(X,Y2,Z2,L) →
Y1 = Y2 $_\wedge$ Z1 = Z2, Unclassified

Relation: EMP

| SS# | Name | Salary | Level |
|-----|------|--------|-------|
| 000 | John | 20K | Unclassified |
| 111 | James | 35K | Unclassified |
| 222 | Mary | 15K | Unclassified |
| 000 | John | 50K | Secret |
| 333 | Jane | 70K | Secret |

Relation: SEN-EMP

| Name | Level |
|------|-------|
| Jill | Unclassified |
| John | Secret |
| David | Secret |

Negative information is handled by assuming that anything that is not either explicitly or implicitly specified in the database is assumed to be false. However, one has to be careful so as to not introduce wrong information. That is, one has to forbid the derivation of positive information from negative information as negative information can be regarded as information that is not positively sure. That is, the following general law (L) cannot be used as derivation rules:

(L): (A1 $\wedge$ ... $\wedge$An→B1 V B2 V B3 ... V Bp) L; where p>1.

Note that the above law can be rewritten as:

(A1 $\wedge$A2 $\wedge$A3 $\wedge$... $\wedge$An $\wedge$ ¬B1 $\wedge$ ¬B2 $\wedge$ ¬B3 . . . $\wedge$ ¬Bp–1→ Bp),L.

The negative information ¬B1, ¬B2, ... ¬Bp–1 is included in the derivation of Bp. Since this negative information could be obtained by default, (i.e., the negative information could be obtained by the absence of positive information), one cannot be completely certain of the validity of the negative information. As a result, one cannot be certain of the validity of any information derived from negative information. If p=1 in the general law (L), then all information is deduced from positive information.

4.5 A Note on Element Level Classification

In our treatment of multilevel databases we have assumed tuple level classifications. That is, an entire tuple is assigned a security level. In reality, however, it is possible for the elements of a tuple to be classified at different security levels. This type of classification is known as element level classification. Element level classifications can be achieved by the use of security constraints (which are part of the general laws). Table 10 shows examples of security constraints which provide element level classifications.

The first constrain SC1 classifies all salary values in a relation EMP at the Secret level. The second constraint SC2 classifies a name value to be Secret if the corresponding salary value is greater than 50K. In the third constraint SC3, the name and salary values taken together are classified at the Secret level.[12] We now discuss how NTML syntax and semantics could be extended to accommodate the enforcement of security constraints.

[12] Note that the constraints SC1, SC2, and SC3 are not expressed as NTML formulas in table 10. In table 11 they are expressed as NTML formulas.

The extensions to NTML that are required are in the area of supporting NULL values. We discuss a possible way to support NULL values. It should be noted that more research needs to be done in this area in order to find sound and complete query evaluation algorithms based on the extended NTML logic. Even in ordinary relational database systems based on horn clause logic, there are many research issues that need to be investigated in supporting NULL values, although the work of Reiter shows much promise, Reiter, R., (Editors: M. Brodie and J. Mylopoulos), 1984, "Towards a Logical Reconstruction of Relational Database Theory," *Conceptual Modelling; Perspectives front Artificial Intelligence, Databases and Programming Languages*, Heidelberg, Germany: Springer Verlag; Reiter, R., April 1986, "A Sound and Sometimes Complete Query Evaluation Algorithm," *Journal of the Association for Computing Machinery*, Vol. 33, No. 2, pp. 349–370.

For each NTML theory we introduce a distinguished constant symbol NULL which is multi-typed. That is, this symbol can take any type as its value. The security level of this symbol is system-low. Each domain D(T,L)(where T is a type and L is a security level) has an element called NULL which is the assignment of NULL under any interpretation with respect to L.

TABLE 10

Security Constraints

SC1: EMP(X,Y,Z) → Level(Z) = Secret
{All salary values in the relation EMP are Secret.}

SC2: EMP(X,Y,Z) $\wedge$Z → 50K → Level(Y) = Secret
{A name value in the relation EMP is Secret if the corresponding salary value is less than or equal to 50K.}

SC3: EMP(X,Y,Z) → Level(Together(Y,Z) = Secret
{A name value and its corresponding salary value taken together in the relation EMP are Secret.}

Table 11 shows how the constraints SC1, SC2, and SC3 are expressed as NTML formulas. Note that these constraints are enforced at the Unclassified level. Therefore, the security levels assigned to the corresponding NTML formulas are Unclassified. At the Secret level these formulas are negated as the security constraints do not apply. Note also that we have assumed that there are only two security levels: Unclassified and Secret. Finally for convenience, we use the word NULL to describe both the constant <u>NULL</u> as well as its assignment.

TABLE 11

Security Constraints as NTML Formulas

Security Constraint SC1 is expressed by the formula R1; its negation at the Secret level is expressed by R2.

R1: $(EMP(X,Y,Z,L) \rightarrow Z = NULL)$, Unclassified
R2: $(\neg \forall \ X/SS\#, Y/NAME, Z/SALARY, L/SL$
$(EMP(X,Y,Z,L) \rightarrow Z = NULL))$, Secret Security Constraint SC2 is expressed by the formula R3; its negation at the Secret level is expressed by R4

R3: $(EMP(X,Y,Z,L) \wedge Z \geq 50K \rightarrow Y = NULL)$, Unclassified
R4: $(\neg(\forall \ X/SS\#, Y/NAME, Z/SALARY, L/SL$
$(EMP(X,Y,Z,L) \wedge Z \geq 50K \rightarrow Y = NULL)))$, Secret Security Constraint SC3 is expressed by the formulas R5 and R6; its negation at the Secret level is expressed by the formulas R7 and R8.

R5: $(EMP(X,Y,Z,L) \wedge Z \neq NULL \rightarrow Y = NULL)$, Unclassified
R6: $(EMP(X,Y,Z,L) \wedge Y \neq NULL \rightarrow Z = NULL)$, Unclassified
R7: $(\neg(\forall \ X/SS\#, Y/NAME, Z/SALARY, L/SL$
$(EMP(X,Y,Z,L) \wedge Z \neq NULL \rightarrow Y = NULL)))$, Secret
R8: $(\neg(\forall \ X/SS\#, Y/NAME, Z/SALARY, L/SL$
$(EMP(X,Y,Z,L) \wedge Y \neq NULL \rightarrow Z = NULL)))$, Secret Next, we briefly discuss how each of the approaches could handle the security constraints. In the first approach, the security constraints which are expressed as NTML formulas are part of the proper axioms of an NTML theory. The multilevel database is also expressed as the proper axioms of the theory. All of the security constraints are treated as derivation rules. When the multilevel database is updated, a new NTML theory is obtained. The consistency of the new theory has to be checked. For example, if the constraints, say, R3 and R4 given in Table 11 are enforced and the NTML axiom →EMP(000, NULL, 60K), Unclassified
→EMP(000, John, 60K), Unclassified then the new NTML theory becomes inconsistent. Instead, if the following axiom →EMP(000, John, 60K), Secret is added to the theory, then the new theory remains consistent.

In the second approach, all of the security constraints expressed as NTML formulas act as integrity rules. Further, the multilevel database is a model of the theory which consists of the integrity rules. Table 12 shows a multilevel database which is a model of the theory which consists of the axioms R3 and R4 of Table 11.

In the third approach, some of the security constraints act as integrity rules and the rest as derivation rules. Since the security constraints specified in Table 10 are not really rules which can be used to derive new data, it seems more appropriate to use them as integrity rules. If so, they are treated as in the case of the second approach. More research needs to be done before it can be determined whether a particular security constraint should be treated as a derivation rule or as an integrity rule.

TABLE 12

Security Constraints as Integrity Rules

Schema S1:
S1:$(\forall \ X/T1, Y/T2, Z/T3, L/SL \ EMP(X,Y,Z,L) \rightarrow$
$T1 = SS\# \wedge T2 = NAME \wedge T3 = SALARY)$, Unclassified Integrity Rules IR1 and IR2:
IR1:$(EMP(X,Y,Z,L) \wedge Z \geq 50K \rightarrow Y = NULL)$,
Unclassified
IR2:$(\ (\forall \ X/SS\#, Y/NAME, Z/SALARY, L/SL$
$(EMP(X,Y,Z,L) \ \ Z \geq 50K \rightarrow Y = NULL)))$, Secret Relation: EMP

| SS# | Name | Salary | Level |
|-----|------|--------|-------|
| 000 | NULL | 60K | Unclassified |
| 000 | John | 60K | Secret |
| 111 | Mary | 40K | Unclassified |
| 222 | NULL | 70K | Unclassified |
| 222 | Jane | 70K | Secret |
| 333 | NULL | 55K | Unclassified |
| 333 | David | 55K | Secret |

4.6 A Note on Data Dependencies

Data dependencies that have been studied extensively are the functional dependencies and multilevel valued dependencies, Maier, D., 1983, *Theory of Relational Databases*, Rockville, Md.: Computer Science Press; Ullman, J., 1988, *Principles of Data and Knowledge Base Systems*, Computer Science Press, Rockville, Md. Dependency statements can be regarded as general laws which are used in the decomposition of relations. Recently, data dependencies have been studied in multilevel database systems, Denning, D. E., at al., April 1987, "A Multilevel Relational Data Model," Proceedings of the IEEE Symposium on Security and Privacy, Oakland, Calif.; Onuegbe, E., December 1987, "Data Dependencies for Multilevel Databases," Technical Note, Honeywell, Inc.; Dwyer, P., E. Onuegbe, P. Stachour, and M. B. Thuraisingham, December 1988, "Query Processing in LDV—A Secure Database Management System," Proceedings of the 4th Aerospace Security Conference, Orlando, Fla.; Jajodia, S., and R. Sandhu, May 1990, "On Polyinstantiation Integrity," Proceedings of the 1990 IEEE Symposium on Security and Privacy, Oakland, Calif. Subsequently, functional and multivalued dependency statements have been proposed.

This paper does not attempt to investigate data dependencies for multilevel relations. Instead it shows that the dependency statements can be expressed as NTML formulas. We state functional and multilevel value dependency statements as given in Onuegbe, E., December 1987, "Data Dependencies for Multilevel Databases," Technical Note, Honeywell, Inc., and specify them in NTML (the limitations of these statements are not addressed here).[13]

[13] It should be noted that we have developed a new dependency, which we call association-based dependency, for multilevel databases. Association dependencies handle association-based constraints (which are also referred to as context-based constraints in the literature, Dwyer, P., G. Jelatis, and M. B. Thuraisingham, June 1987, "Multilevel Security for Database Management Systems," *Computers and Security*, Vol. 6, No. 3). An example of an association-based constraint is SC3, given in table 10. Association dependencies can also be represented as NTML formulas. However, we do not address association dependencies in this paper. They are described elsewhere, Thuraisingham, M. B., 1990, "Association Dependencies for Multilevel Databases," WP-28904, The MITRE Corporation, Bedford, Mass. (not currently in the public domain).

Functional Dependencies

Let $(R(X1, X2, X3, \ldots Xn))$ be an n-ary relation which is visible at a security level L (i.e., the NTML formula that corresponds to R is assigned an inherent security level L or lower). Let Y and Z be two subsets of $\{X1, X2, \ldots Xn\}$. Then the functional dependency statement $Y \rightarrow Z$ holds for R at L, if and only if the following two conditions are satisfied:

(a) Whenever two tuples at level L have equal values for Y, they also have equal values for Z.

(b) Whenever an integrity constraint enforces any component of the value of Y to be NULL at level L, then the value of Z must be NULL (note this second condition will ensure that the security level of the value of a set of attributes will dominate the security level of the value of a second set of attributes if the former is functionally dependent on the latter).

Let the function dependency statement be $X1, X4 \rightarrow X3, X6$. This statement is expressed by the following NTML formulas F1 and F2.

F1: $(\forall\ x1/t1, x2/t2, \ldots xn/tn, x2'/t2, x5'/t5, x6'/t6, \ldots xn'/tn\ [R(x1, x2, \ldots xn, L) \land R(x1\ x2', x3', x4, x5', x6', \ldots xn', L) \rightarrow (x3=x3' \land x6= x6')])$, Unclassified F2: $(\forall x1/t1, x2/t2, \ldots xn/tn\ [R(x1, x2, \ldots xn, L) \land (x1=\text{NULL} \lor x4=\text{NULL}) \rightarrow (x3=\text{NULL} \land x6=\text{NULL})])$, Level=L Multivalued Dependencies Informally multivalued dependency can be defined as follows for multilevel databases:

Let $R(x1, x2, x3, \ldots xn)$ be an n-ary relation. Let Y and Z be subsets of $\{X1, X2, \ldots Xn\}$ and T be the complement in $\{X1, X2, \ldots Xn\}$ of $\{Y \cup Z\}$. The multivalued dependency statement $Y \rightarrow Z$ holds for R if and only if the following conditions are satisfied:

(a) If y1, t1, z1, and y1, t2, z2 are, respectively, the Y, T and Z values of 2 tuples in R, then y1, t1, z2, and y1, t2, z1 are also, respectively, the Y, T, and Z values of 2 tuples in R.

(b) If any component of the value of Y is NULL, then the value of T and Z are NULL.

Let the multivalued dependency statement be $X1, X4 \rightarrow X3, X6$. This statement is expressed by the following NTML formulas F3 and F4.

F3: $(\forall\ x1/t1, x2/t2, \ldots xn/tn, \exists\ x2'/t2, x5'/t5, x7'/t7, \ldots xn'/tn\ [R(x1, x2', x3, x4, x5', x6, x7', \ldots xn', L) \land R(x1, x2, x3', x4, x5, x6', \ldots xn, L) \rightarrow R(x1, x2, x3, \ldots xn)])$, Unclassified F4: $(\forall\ x1/t1, x2/t2, \ldots xn/tn\ [R(x1, x2, \ldots xn, L) \land (x1=\text{NULL} \lor x4=\text{NULL}) \rightarrow x2=\text{NULL} \land x6=\text{NULL} \land \ldots \land xn=\text{NULL})])$, Unclassified 4.7 A Note on the Inference Problem The inference problem in database security deals with the situation where users acquire unauthorized information from the information that they legitimately acquire. Various formulations of the inference problem have been given. In Thuraisingham, M. B., December 1987, "Security Checking in Relational Database Management Systems Augmented with Inference Engines," *Computers and Security*, Vol. 6, No. 6; Keefe, T., M. B. Thuraisingham, and W. T. Tsai, March 1989, "Secure Query Processing Strategies," *IEEE Computer*, Vol. 22, No. 3; Thuraisingham, M. B., September 1989, "Inference Problem in Database Security," M89-52, Volume 3, The MITRE Corporation, Bedford, Mass. (not currently in the public domain), a formulation of this problem within the context of query processing is described. In Morgenstern, M., May 1987, "Security and Inference in Multilevel Database and Knowledge Base Systems," Proceedings of the ACM SIGMOD Conference, San Francisco, Calif.; Morgenstern, M., April 1988, "Controlling Logical Inference in Multilevel Database Systems," Proceedings of the 1988 IEEE Symposium on Security and Privacy, Oakland, Calif.; Hinke, T., 1988, "Inference Aggregation Detection in Database Management Systems," Proceedings of the IEEE Symposium on Security and Privacy, Oakland, Calif., inference problem is formulated within the context of database design. In this section, we discuss the inference problem within the framework of NTML.

We examine each approach for formalizing database concepts and discuss the inference problem associated with each approach. First, note that for security violations via inference to occur, there must be a set of tuples which classify various information. The information includes the database data as well as other information that the users possess.

Inference Problem and the Perceived Multilevel Universe as an NTML Theory Approach In the first approach, the database as well as the general laws are represented as axioms of an NTML theory. We now extend the database to include all the information the users possess. Any security constraint which classifies any piece of information is regarded as a general law. Therefore, the proper axioms of the NTML theory are all the general laws and the extended database.

We now separate the general laws into two: general laws which are security constraints and general laws which are not security constraints. Inference checking then amounts to checking the consistency of the NTML theory whenever it is updated. If the theory is inconsistent, and if any of the security constraints were used to prove its inconsistency, then there is a potential for security violations via inference. That is, inference checking amounts to checking the consistency of the theory.

Inference Problem and the Multilevel Database as a Model Approach

In the second approach, the multilevel database is considered to be a model of the NTML theory whose axioms are the general laws. Note that in this approach all of the constraints are treated as integrity rules.

This approach is not appropriate for inference checking because the multilevel database only has partial information. That is, it may not be the case that all of the information that a user possesses can be represented in the database. The general laws are enforced on the data in the database. The general laws could be separated into two groups: those that are security constraints and those they are not. Inference checking then amounts to checking the validity of the security constraints whenever the database is updated. If any of the security constraints are violated, then security violation via inference occurs. However, since all real-world information or general laws may not be involved in the inference checking process, all security violations via inference cannot be detected.

Inference Problem and the Integrated Approach

In the third approach, some of the general laws are treated as integrity rules and some as derivation rules. Since the security constraints are also general laws, one could separate the security constraints into two groups: one group consists of those security constraints that act as derivation rules and the other group consists of those constraints that act as integrity rules. The multilevel database is a model of the general laws which are enforced as integrity rules. The real-world information can be captured as part of the axioms of the NTML theory.

Inference checking amounts to the following. Whenever the multilevel database is updated, if any of the security constraints which are integrity rules are violated then security violation via inference could occur (see the discussion for the second approach). Whenever axioms of the NTML theory are modified (depending on the evolution of the real world), the consistency of the resulting theory is checked. If the theory is inconsistent, then security violation via inference could occur (see the discussion for the first approach).

Section 5

NTML as a Programming Language

In this section we describe our preliminary investigation towards the development of a programming language based on NTML. In section 5.1 we discuss the motivation for such a language and in section 5.2 we describe a resolution rule.

5.1 Motivation

The advent of logic programming languages during the 1970s enabled computing systems to exhibit a certain degree of intelligence or deductive reasoning—an important feature which until then, remained relatively elusive. In other words, logic programmers need specify only the logic component of an algorithm without having to write any procedures or sets of instructions for the computer. The latter task is often tedious and time-consuming and can be effectively handled by the deductive reasoning component of the logic programming system.

Logic programming languages, such as Prolog, are gaining in popularity and are being heralded as languages of the future. Therefore, it is important and useful that a logic programming language be developed that is appropriate for knowledge-based military applications. That is, one that incorporates constructs for multilevel security. However, current logic programming languages cannot be used for knowledge-based multilevel secure applications as they require the programmer to specify the procedures, thus causing it to lose the main advantages of logic programming. In contrast, we have developed the initial features of a logic programming language, called NTML-Prolog, for multilevel applications. NTML-Prolog is based on a subset of NTML. Such a development will be of significance to multilevel knowledge-based applications in the same way Prolog has been to the development of knowledge-based applications.

In section 5.2, we describe the essential points towards the development of a logic programming language that we call NTML-Prolog. In particular, we describe an NTML-Prolog Program and a resolution rule for NTML-Prolog. Much research needs to be done before an interpreter for NTML-Prolog can be implemented. However, producing a workable NTML-Prolog system will be significant in the development of multilevel intelligent data/knowledge base management systems in the same way Prolog has marked a significant milestone in the development of intelligent data/knowledge base management systems.

5.2 NTML-Prolog

In this section we discuss the essential points of NTML-Prolog. We assume that the reader is familiar with the programming language Prolog, Clockskin W., and Mellish, C., 1984, *Programming in Prolog,* Heidelberg, Germany: Springer Verlag.

An NTML program consists of a set of program clauses. A program clause is of the form (((A,L)←(B1, L1), (B2, L2), . . . , (Bn, Ln)),L*)

or (((NOT ((A,L)←(B1, L1), (B2, L2), . . . , (Bn, Ln)))), L*)

where $n \geq 0$ (note that if n=0, then there are no B1s),

L, L1, L2, . . . Ln, L* are security levels

L, L1, L2, . . . Ln are all $\leq L^*$ (if the security levels are constants)

A, B1, B2, . . . Bn are (positive) atomic NTML formulas.

The second form is the negation of the first form. The first form is read as follows:

"To show that A is true at level L, we need to show that B1, B2, . . . Bn are all true at levels L1, L2, . . . Ln, respectively. Further, this entire statement is true at the level L*."

A goal clause is of the form:

←(B1, L), (B2, L), . . . (Bn, L)

where $n \geq 1$, L1, L2, . . . Lm are security levels and B1, B2, . . . Bn are (positive) atomic NTML formulas.

Note that an NTML-Prolog program is based only on a subset of NTML. That is, we involve only the clauses with at most one negative NTML atom.[14]

[14] If we do not explicitly specify the level of an atomic formula, then we assume that its level is system-low.

Next, we describe the algorithm which implements the resolution rule for NTML-Prolog. A query posed by a user at security level L is expressed as a goal associated with level L. Let the goal be ←(A1, L), (A2, L), . . . (Am, L).

The resolution principle is implemented as follows.

For each i ($1 \leq i \leq m$) do the following:

Unify (Ai, L) with some program clause (((A*, L')←(B1, L1), (B2, L2), . . . (Bt, Lt)), L*)

where the following conditions are satisfied:

(a) $L^* \leq L$ if L* is a constant. (Note that L', L1, L2, . . . Lt are all $\leq L^*$)

(b) It is not the case that there is a security level L" where $L^* \leq L" \leq L$ such that (((NOT (A*, L')←(B1, L1), (B2, L2), . . . (Bn, Ln))), L").

Note, by unification we mean find the most general unifier for Ai and A* which satisfies the conditions stated above.

If a unifier cannot be found, then there is no solution for the query. Return "failure" as the response.

If there is such a unifier, then it is included in the response being assembled. Try the procedure (i.e., unification) for the (Ai+1, L).

End (for each response).

Return the response to the query. If another solution has to be found, then repeat the same procedure, but exclude the previous responses in the unification process. That is, find only the new solutions.

This ends the algorithm for implementing the resolution principle.

The resolution principle as described here will ensure that appropriate responses at or below the user's level will be retrieved. Future work will include the investigation of the completeness and soundness of the resolution rule as described here.

Section 6

Proposals for Handling Negative Information

As stated in Nicolas, J., and H. Gallaire, (Editors: H. Gallaire and J. Minker), 1978, *Database: Theory vs Interpretation,* New York: Plenum Press, negative information corresponds to the fact that a given tuple does not satisfy a relation and may have to be represented by a negative ground literal. In a logical system, positive and negative information are treated in the same way. That is, both types of information have to be explicitly specified or derived from other information. In database applications, negative information is represented implicitly. That is, the negation of any statement is assumed to be true if the statement is not asserted. Such an implicit representation of negative information has been investigated extensively by researchers of logic programming and databases. The most notable efforts are those of Reiter, Reiter, R., 1978, "On Closed-World Databases," (Editors: H. Gallaire and J. Minker), *Logic and Databases,* New York: Plenum Press; Clark, Clark, K., (Editors: H. Gallaire and J. Minker), 1978, "Negation as Failure," *Logic and Databases,* Plenum Press, New York; and Nicolas and Gallaire, Nicolas, J., and H. Gallaire, (Editors: H. Gallaire and J. Minker), 1978, *Database: Theory vs Interpretation,* New York: Plenum Press. Many of the other proposals for handling negative information, Minker, J., 1982, "On Definite Databases and the Closed World Assumption," Proceedings of the Sixth Conference on Automated Deduction, Springer Verlag, Berlin, Germany; Shepardson, J. C., 1984, "Negation as Failure Rule," *Journal of Logic Programming,* Vol. 1; Shepardson, J. C., 1985, "Negation as Failure Rule—II," *Journal of Logic Programming,* Vol. 2, can be regarded as an evolution of these earlier proposals.

In Thuraisingham, M. B., (Editor: T. Lunt), May 1988, "Foundations of Multilevel Databases," Presented at the 1st RADC Database Security Invitational Workshop, Menlo Park, Calif. (Proceedings published by Springer Verlag, Heidelberg, Germany), an attempt was made to extend Reiter and Clark's proposals for multilevel databases. However, as stated earlier; that effort is solely based on first-order logic, and therefore does not capture many of the essential features of multilevel reasoning and data processing. Our discussion on viewing multilevel databases through NTML, given in section 4, showed how Nicolas and Gallaire's proposal could be adapted for a multilevel environment. As part of this discussion, issues on handling negative information were also addressed. In particular, the following conclusions were reached for the three approaches to handle negative information. They are the following:

(1) In the proof-theoretic approach, negative information must be made explicit.

(2) In the model theoretic approach, it is implicitly assumed that a tuple which does not appear in the extension of a relation does not satisfy it.

(3) In the integrated approach it is implicitly assumed that a tuple which does not appear in the extension of a relation does not satisfy it. But there is an additional problem here, as some of the laws are used as derivation rules, and, therefore, one can envisage information to be deduced from negative information implicitly assumed. This problem is overcome by not permitting certain rules to be derivation rules.

In section 6, we consider Reiter's and Clark's proposals to handle negative information within the framework of NTML. Reiter's proposal, known as the closed world assumption (CWA), states that negative information does not cause any complications if there are no gaps in the knowledge. Reiter also shows that, when only ground literals are handled, CWA does not produce any inconsistencies. But when general laws are taken into consideration, and when a deduction process is involved, this is not always the case. Clark's proposal is concerned with interpreting negation as failure. He calls such a rule "the negation as failure rule" and develops a proof procedure for a horn clause logic program which handles negation. In section 6.2 we discuss CWA, and in section 6.3 we discuss negation as failure within the framework of NTML.

6.2 Closed World Assumption for Multilevel Databases 6.2.1 Overview

Reiter, Reiter, R., 1978, "On Closed-World Databases," (Editors: H. Gallaire and J. Minker), *Logic and Databases,* New York: Plenum Press, has distinguished two conditions under which queries could be evaluated; the open-world assumption (OWA) and the closed-world assumption (CWA). Under OWA, queries are evaluated using the first-order approach. That is, queries are expressed as formulas of first-order logic, and proofs of the formula are attempted. Each proof will produce an answer to the query. Under CWA, if no proof of a positive ground literal exists, then its negation is assumed to be true. That is, certain answers to a query are permitted as a result of the failure to find proofs. Under CWA, the database constitutes all positive ground literals explicitly specified, plus the negation of the ground literals implicitly assumed to be true. For applications which utilize logic for knowledge representation, it may be necessary to evaluate queries under OWA. But Reiter points out that, for many database applications, it is reasonable to evaluate queries under the CWA.

Our intent is to examine the various issues involved in extending CWA to a multilevel environment. A preliminary discussion on this topic will be given in section 6.2.2. First, we discuss some terminology. We also explain OWA for a multilevel environment as it can then be compared with CWA.

We assume that queries are expressed as NTML formulas. The level L of the user posing the query is the level at which the formula is specified.[15] A multilevel database (MBD) is a NTML-Prolog program (which contains no function signs). An answer to a query $$Q = (\forall x/T1 \mid \exists y/T2\ W(x,y),L)^{16}$$

is a set of elements (c1, c2, . . . cn) if and only if the following conditions are satisfied:

(1) Each ci is of type T1, (2) Level(ci)≦L, (3) MDB ⊢ $V_1 \leq i \leq n$ (∃y/T2 W(ci, y)) with respect to L (i.e., the proof of the formula does not involve any information which is not dominated by L).

[15] Note that the level at which the formula is asserted dominates the inherent level of the formula.

[16] Note that x and y could be tuples instead of individual elements. We assume that they are individual elements for convenience. The query requests to find all x such that there is a y for which W(x,y) holds.

The set of all such answers will form the response to a query. The notation {c1+c2+c3+ . . . cn} is also used to denote the answer {c1+c2+c3+ ... cn}. It should be noted that if {c1, c2, ... cn} is an answer, then so will {c1, c2, c3, ... cn, cn+1} be an answer provided cn+1 is of type T1 and has level ≦L. This suggests the need for a minimal answer. A minimal answer to Q is defined to be an answer such that no proper subset of it will be an answer. If an answer consists of a single element {c}, then it is a definite answer. Otherwise it is an indefinite answer. Evaluating Q under open world assumption amounts to finding all minimal answers to Q. This is denoted by $\|Q\|_{OWA}$. We could also attach the security level L and denote it by $\|Q\|_{OWA}(L)$.

Consider the following example. We assume that there are only two security levels; Unclassified and Secret.
Let MDB consist of the following set E of employees and set D of departments. We use U to denote Unclassified and S to denote Secret.

E={e1(U), e2(U), e3(U), e4(S)}

D={d1(U), d2(U), d3(S)}

Let the integrity constraints enforced at the Unclassified level be the following:

"Every employee must work in at least one department"
The constraint is expressed by the NTML formula:

(∀x/EMP ∃y/DEPT Works(x,y), U)

Additional facts in the database are the following:

(Works(e1, d1), U)

(Works(e2, d3), S)

Suppose Unclassified and Secret users pose queries to find out where the employees are working. The queries will be expressed by the following NTML formulas.

(∀x/EMP ∀y/DEPT Works(x,y), U)

(∀x/EMP ∀y/DEPT Works(x,y), S)

The response (under OWA) to the query issued by the Unclassified user will be:

{(e1, d1), (e2, d1)+(e2, d2), (e3, d1)+(e3, d2)}.

The response (under OWA) to the query issued by the Secret user will be:

{(e1, d1), (e2, d3), (e3, d1)+(e3, d2)+(e3, d3), (e4, d1)+(e4, d2)+(e4, d3)}.

The specific techniques employed to obtain these answers have been adapted from Reiter's work on query evaluation under OWA described in Reiter, R., (Editors: Gallaire and J. Minker), 1978, "Deductive Question Answering on Relational Databases," *Logic and Databases*, Plenum Press, New York.

6.2.2 Closed World Assumption

We first illustrate query evaluation under CWA using a purely extensional multilevel database MDB. Such a database consists of ground literals of different security levels.[17] We assume that there are only two security levels; Unclassified and Secret.

[17] In general the extensional portion of a multilevel database MDB is denoted by MEDB. In this example, we assume that MDB and MEDB are the same.

Consider the multilevel database shown in Table 13. There are two domains EMP and DEPT. The MDB consists of one relation 'Works.' Note that, at the Unclassified level, e1 works in d1. At the Secret level, e1 works in d2. This could mean that, at the Secret level, e1 works in both d1 and d2, or the tuple is polyinstantiated. For this discussion we assume that it is the former. That is, at the Secret level e1 works in both departments.[18] Note also that e4 works in both departments d1 and d3 at the Secret level.

[18] If we want to assume at the Secret level that e1 does not work in department d1, then, as discussed in the model theoretic approach to multilevel databases, we need to duplicate every tuple that holds in the Unclassified level at the Secret level also. We will see that, if negative information is explicitly specified, then negations at the Secret level can also be explicitly specified. That is, the tuple (e1,d1) can be included in the relation ¬Works, as shown in table 14.

TABLE 13

A Multilevel Purely Extensional Database

EMP = {e1(U), e2(U), e3(U), e4(S)}
DEPT = {d1(U), d2(U), d3(S)}

Works

| Ename | Dname | Level |
| --- | --- | --- |
| e1 | d1 | U |
| e2 | d3 | S |
| e3 | d2 | U |
| e4 | d1 | S |
| e1 | d2 | S |
| e3 | d1 | U |
| e4 | d3 | S |

Consider the following query posed at both the Unclassified and Secret levels.

(∀x/EMP | ¬Works(x,D2), U)

(∀x/EMP | ¬Works(x,D2), S)

The query requests all those employees who do not work in department D2. Under OWA, the response to this query is NULL at both security levels. That is, $\|Q\|_{OWA}(U) = \|Q\|_{OWA}(S) =$ Empty set.

What we actually want is the response {e1,e2} at the Unclassified level and the response {e2,e4} at the Secret level. Under OWA, this response cannot be obtained as first-order logic and does not implicitly assume anything that is not present in the database. Therefore, in order to obtain the responses that we want, we need to explicitly specify the relation ¬Works (usually denoted by Works) in the database. Table 14 shows the relation ¬Works. The relation ¬Works (U) has all the negative information at the Unclassified level and the relation ¬Works (S) has the negative information at the Secret level. [19] The database which consists of the negative information is the complement of MEDB and is denoted by Comp-MEDB[20]. Therefore, in order to evaluate a query, the database MDB and Comp-MEDB (the complement of its extensional component) have to be examined.

[19] We can also assume that any negative information at the Unclassified level also is valid at the Secret level unless it is stated as positive information at the Secret level. If so, the tuples in ¬Works at the Unclassified level that are valid also at the Secret level are (e2,d1) and (e2,d2). These tuples need not be explicitly specified at the Secret level.

[20] Note: Comp-MEDB is the complement of MEDB.

We now formally define query evaluation under CWA for a multilevel extensional database MDB and then extend the definition to an arbitrary database.

TABLE 14

Representing Negative Information

| ¬Works(U) | | ¬Works(S) | |
| --- | --- | --- | --- |
| Ename | Dname | Ename | Dname |
| e1 | d2 | e1 | d3 |
| e2 | d2 | e2 | d2 |
| e2 | d1 | e2 | d1 |
| | | e3 | d3 |
| | | e4 | d1 |
| | | e4 | d2 |

Let MDB be a multilevel extensional database. Let Comp-MEDB consist of all negative ground literals of the form $\neg Pc$, L) where P is a predicate and c is a constant (could possibly be ample) and (Pc, L) is not a ground literal of MDB. Consider a query of the form: ($\forall$ x/T1 | ($\exists$ y/T2 W(x,y), L).
Then c is an answer to this query under CWA if and only if the following conditions are satisfied:

(1) c is of type T1, (2) Level(c)$\leq$L, (3) MDB U Comp-MEDB $\vdash \neg(\exists y/T2\ W(c,y))$ with respect to L.

Query evaluation under CWA for purely extensional MDBs are straightforward. That is, in order to evaluate a query, only the MDB and the Comp-MEDB are examined. Any tuple that satisfies the query from MDB U Comp-MEDB will be an answer.

Next, we examine query evaluation under CWA for an arbitrary multilevel database. Such a database has an extensional component and an intensional component which consist of a set of general laws which are formulas of NTML. The Comp-MEDB in such a database consists of all negative information of the form $\neg Pc$ where P is a predicate, c is a constant (possibly a tuple) and $\neg$(MDB $\vdash$Pc) with respect to any $\forall$ security level L. That is, information is assumed to be negative only if its positive counterpart cannot be deduced with respect to any security level from the multilevel database.

Consider the query ($\forall$x/T1 | ($\exists$ y/T2 W(x,y)), L).
Then (c1+c2+c3+ ... cn) is an answer under CWA to this query if and only if the following conditions are satisfied:

(1) Each ci is of type T1, (2) Each ci has level$\leq$L, (3) MDB U Comp-MEDB $\vdash$ $V_{1 \leq i \leq n}(\exists y/T2\ W(ci,y))$ with respect to L.

As in the case of query evaluation under OWA, we can define minimal answers, definite answers, and indefinite answers for query evaluation under CWA.

We illustrate query evaluation under CWA for an arbitrary multilevel database with an example. Consider the MDB shown in table 15. There are three domains: EMP (for employees), CSCI (for computer science departments), and DEPT (for departments). The elements of the various domains are also shown in the table. Note that a computer science department is also a department. We assume that there are only two security levels Secret and Unclassified.

TABLE 15

A Multilevel Deductive Database

EMP = {e1(U), e2(U), e3(S)}
CSCI = {c1(U), c2(U), c3(U), c4(S)}
DEPT = {d1(U), d2(U), d3(S), c1(U), c2(U), c3(U), c4(S)}
Law 1: $\forall$x/EMP $\forall$ y,z/DEPT Works(x, y) $\wedge$ SubDept (z,y) $\rightarrow$ Works(x,z)
Law 2: $\forall$ x/CSCI Works(d2,x)
Law 3: $\forall$x,y,z/DEPT SubDept(z,y) $\wedge$ SubDept(y,x) $\rightarrow$ SubDept(z,x)

| Works | | | SubDept | | |
| --- | --- | --- | --- | --- | --- |
| Ename | Dname | Level | Dname | Dname | Level |
| e1 | d1 | U | d2 | d1 | U |
| e3 | c3 | S | d3 | d2 | S |
| e3 | c4 | S | c1 | d1 | U |
| | | | c2 | c1 | U |

The extensional MDB consists of two relations, Works and Subdept (the subdepartment relation). The intensional MDB consists of three general laws, which are represented as NTML formulas at the Unclassified level. These laws state the following:

Law 1: Any employer who works in a department works in all its sub-departments.

Law 2: Employee e2 works in all computer science departments.

Law 3: The 'Subdept' relation is transitive.

TABLE 16

Representing Negative Information for a Multilevel Deductive Database

| ¬Works | | | ¬SubDept | | |
| --- | --- | --- | --- | --- | --- |
| Ename | Dname | Level | Dname | Dname | Level |
| e1 | c3 | U | d1 | d1 | U |
| e1 | c4 | S | d1 | d2 | U |
| e3 | d1 | S | d1 | d3 | S |
| e3 | d2 | S | d1 | c1 | U |
| e3 | d3 | S | d1 | c2 | U |
| e3 | c1 | S | d1 | c3 | U |
| e3 | c2 | S | d1 | c4 | S |
| e2 | d1 | U | d2 | d2 | U |
| e2 | d2 | U | d2 | d3 | S |
| e2 | d3 | S | d2 | c1 | U |
| . | . | . | . | . | . |
| . | . | . | . | . | . |

Part of Comp-MEDB for the MDB under consideration is shown in table 16. Note that in this table we have combined the tuples at various security levels into one relation. We also assume that negative information at the Unclassified level is also valid at the Secret level provided the positive counterpart cannot be derived either implicitly or explicitly at the Secret level.

The following comments are in order:

(1) Under CWA there are no gaps in our knowledge. That is, nothing is uncertain. This is because, for each predicate P, constant c, and level L, either Pc can be deduced from MDB or $\neg$Pc can be deduced from Comp-MEDB with respect to L. Further, since the multilevel database is taken to be MDB U Comp-MEDB, it will definitely be the case that either Pc or $\neg$Pc can be deduced from MDB U Comp-MEDB. Therefore, intuitively, it seems that all answers under CWA with respect to any security level are definite. Reiter has formally proved this for a nonmultilevel database. It appears that this proof can be extended to include a multilevel database also.

(2) It can be seen that the negative information that has to be represented is very large. For any practical application it may not be possible to efficiently represent all the negative facts. Reiter has proved that, for many cases, the negative information need not be taken into consideration for query evaluation under CWA. That is, he shows that, for many cases, query evaluation coincides both under OWA and CWA. However, for some cases this does not work, and therefore negative information has to be explicitly specified. Reiter also shows that when the database is a non-Horn database, inconsistencies can arise with respect to CWA. However, if the database is a horn database, then it is consistent under CWA. Future work should include investigating the applicability of Reiter's results for query evaluation under CWA in a multilevel database.

6.3 Negation as Failure Rule for Multilevel Databases

6.3.1 Overview

Clark, Clark, K., (Editors: H. Gallaire and J. Minker), 1978, "Negation as Failure," *Logic and Databases*, Plenum Press, New York, has defined a query evaluation process for a logic database (i.e. a deductive database) consisting of a set of clauses to be essentially Horn Clause theorem proving with a special inference rule which he calls the negation as failure rule in order to deal with negation. The negation as failure rule (denoted NF) simply states that $\neg P$ can be inferred if every proof of P fails. That is:

From $\vdash \neg \vdash P$ infer $\vdash \neg P$.

The proof that P is not provable is an exhaustive but unsuccessful search for at least one proof of P.

It is useful to compare the proposals of Reiter (CWA) and Clark (NF) to handle negation. The information $\neg A$ can be inferred under CWA if A cannot be proven to be a consequence of the logic database. As stated in Lloyd, J., 1987, *Foundations of Logic Programming*, (2nd Edition), Heidelberg, Germany: Springer Verlag, in logic programming terminology, this amounts to the following: If A is not in the success set of the database DB, then $\neg A$ is inferred. For A not to be in the success set of DB, either A is in the SLD finite failure set or the SLD-tree has at least one infinite branch. If A is in the SLD-finite failure set, then under CWA, we can assume $\neg A$. If there is an infinite branch in the SLD-tree, then, unless there is a mechanism for detecting infinite branches, it will not be possible to show that A is not a logical consequence of the database DB.

In logic programming terminology, "if the logic database is a set of Horn clauses, then the NF states that if A is in the SLD finite failure set of a logic database DB, then infer $\neg A$. We can see that NF is weaker than CWA. However, as stated in Lloyd, J., 1987, *Foundations of Logic Programming*, (2nd Edition), Heidelberg, Germany: Springer Verlag, in practice, implementing anything beyond NF is difficult.

[21] For the logic programming terminology that we have used we refer to Lloyd, J., 1987, *Foundations of Logic Programming*, (2nd Edition), Heidelberg, Germany: Springer Verlag.

In section 6.3.2 we discuss how the NF rule could be applied for multilevel databases. We regard a multilevel database as an NTML-Prolog program. Query evaluation in such a database is resolution theorem proving. The resolution rule is the one that we have described in section 5 with negated literals evaluated by a failure proof. That is, we augment the resolution rule that we have designed with the rule NF for multilevel databases.

6.3.2 NF Rule for Multilevel Databases

The multilevel database consists of a set of NTML-Prolog clauses. Note that an NTML-Prolog clause could be a positive clause or it could be the negation of a positive clause at a different security level. We assume that each clause has a distinguished positive literal. The positive literal is what the clause defines and is placed at the head. For example, a clause is either of the form $$(((R(t1,t2, \ldots tn), L^*) \leftarrow (K1, L1) \mathsf{L} \, K2, L2) \mathsf{L} \, K3, L3) \ldots Kn, Ln)), L)$$

or $$\neg ((R(t1,t2, \ldots tn), L^*) \leftarrow (K1, L1) \mathsf{L} \, (K2, L2) \mathsf{L} \, (K3, L3) \ldots (Kn, Ln))$$

We first describe the query evaluation algorithm, and then illustrate example.[22]

[22] Compare this algorithm with Clark's SLDNF proof procedure.

Resolution Rule Augmented with NF for Multilevel Databases

Begin
Let the query to be evaluated be $(\leftarrow (K1, L) \mathsf{L} \, (K2, L) \mathsf{L} \, (K3, L) \mathsf{L} \ldots Kn, L))$. Call it the current query Q.
Until an empty query is derived and the evaluation succeeds, do the following:
Select a literal from the current query so that a negative literal is selected only if it does not have any variables.

Case 1
Ki is a positive literal $R(t1,t2, \ldots tm)$.
Nondeterministically, choose a database clause
$(((R(t1', t2', \ldots tm'), L+) \leftarrow (K1', L1) \wedge (K2', L2) \wedge \ldots (Kn', Ln)), L^*)$ such that the level $L^*$ is dominated by L, and the clause is not negated at any level between $L^*$ and L.
Attempt to unify Ki' with $R(t1', t2', \ldots tm')$. If Ki does not unify with this clause, then try another clause. If there is no other clause, the query fails. If Ki' does unify with $R(t1', t2', \ldots tm')$, find the most general unifier $\emptyset$ and replace the current query by $$((\leftarrow (K1, L) \wedge (K2, L) \wedge \ldots (Ki-1, L) \wedge (K1', L) \wedge (K2', L) \wedge \ldots (Kn',L) \wedge (Ki+1, L) \wedge (Ki+2, L) \wedge \ldots (Kn, L)) \emptyset.$$

Case 2
Ki is a negative ground literal $\neg P$. Negative literals are proved by showing that all proofs of its positive counterpart fail. Therefore recursively enter the query evaluation process with $(\leftarrow P, L)$ as a query. If the evaluation of this query succeeds, then P has been shown to be a logical consequence of the multilevel database with respect to level L. Therefore $\neg P$ cannot be assumed to be true. This means that the evaluation of the original query Q fails.
If the evaluation of $(\leftarrow P, L)$ fails for every path of its nondeterministic evaluation, this means that all proofs of P fail, and therefore $\neg P$ can be assumed to be a lemma. Hence, the current query can be replaced by the query:

$$(\leftarrow (K1, L) \wedge (K2, L) \wedge \ldots (Ki-1, L) \wedge (Ki+1, L) \wedge \ldots (Kn, L))$$

End.
We now illustrate the query evaluation process with an example. Consider the following NTML-Prolog program which consist of the clauses C1–C25.

C1: (((Works(e1,d1), U)←), U)
C2: (((Works(e3, c3), S)←), S)
C3: (((Works(e3, c4), S)←), S)
C4: (((Works(x,z), L)←(Works(x,y), L) L (SubDept(z,y), L)), U)
C5: (((Works(e2, x), L)←(CSCI(x), L)), U)

C6: (((EMP(e1), U)←–), U)
C7: (((EMP(e2), U) ←–), U)
C8: (((EMP(e3), S) ←–), S)
C9: (((CSCI(c1), U) ←–), U)
C10: (((CSCI(c2), U)→), U)
C11: (((CSCI(c3), U)←–), U
C12: (((CSCI(c4), s) ←–), s)
C13: (((DEPT(d1), U) ←–), U)
C14: (((DEPT(d2), U) ←–), U)
C15: (((DEPT(d3), S) ←–), S)
C16: (((EMP(x), L)←(Works(x,y), L)), U)
C17: (((DEPT(y), L)←(Works(x,y), L)), U)
C18: (((DEPT(x), L)←(CSCI(x), L)), U)
C19: (((DEPT(x), L)←(SubDept(x,y), L)), U)
C20: (((DEPT(y), L)←(SubDept(x,y), L)), U)
C21: (((SubDept(z,x), L)←(SubDept(z,y), L) L (SubDept(y, x)), L), U)
C22: (((SubDept(d2,d1), U) ←–), U)
C23: (((SubDept(d3,d2), S) ←–), S)
C24: (((SubDept(c1,d1), U) ←–), U)
C25: (((SubDept(c2,c1), U) ←–), U)

Let the query posed by an Unclassified user be the following:

((Works(x,d1), U) ∧ ¬SubDept(d1,d2), U))

This query requests to find all those who work in department d1 provided d1 is not a subdepartment of d2. The query evaluation algorithm will nondeterministically select a literal to be evaluated. Suppose the negative literal ¬SubDept(d1,d2) is selected. Since this literal is ground, there is no problem. In order to evaluate a negative literal, it has to be shown that all proofs of its positive counterpart fail. Therefore, the query to be evaluated is:

(←SubDept(d1,d2), U).

Examining clauses C5, C22, C23, C24 and C25, it can be shown that the goal (←SubDept(d1,d2),U) is not satisfied. Therefore ¬SubDept(d1,d2) can be asserted as a lemma at the Unclassified level.

Next, the algorithm will evaluate Works(x,d1). If all solutions are to be found, then the algorithm is executed repeatedly assuming that ¬SubDept(d1,d2) is a lemma until no more answers are obtained. It can be shown that the answer to the query is {e1}.

We have stated the essential points in applying NF rule for a multilevel database. Future research should include the investigation of the soundness and completeness of the proof procedure that we have developed. This would also involve investigating issues on the completion of multilevel databases.[23] It should be noted that we need to first investigate the soundness and completeness of the resolution rule that we developed in section 5 for multilevel databases before investigating these issues for the augmented resolution rule described in this section.

[23] Completion of databases are discussed in Clark, K., (Editors: H. Gallaire and J. Minker), 1978, "Negation as Failure," *Logic and Databases*, Plenum Press, New York.

Section 7

Integrity Checking in Multilevel Databases

7.1 Overview

In this section we describe how integrity constraints may be handled in multilevel databases. Integrity constraints are also known as general laws. Two types of general laws have been studied in the past for database systems. They are state laws and transition laws. State laws are laws which refer only to one state of the world. Transition laws are relative to world evolution.

In section 4 we describe how general laws may be handled by the three approaches to formalizing multilevel database concepts. In the proof theoretic approach, all general laws are regarded as derivation rules. That is, these laws are used to deduce new information. In the model theoretic approach, all general laws are treated as integrity rules. That is, these laws must be satisfied by the multilevel database. In the integrated approach, some laws are treated as derivation rules and others as integrity rules.

For multilevel databases, the general laws also include the security constraints which are used to assign security levels to the data. As described in section 4, some of the security constraints may be used as integrity rules and others as derivation rules. For example, consider the following security constraint enforced at the Unclassified level:

"A name of an employee is Secret if his salary is greater than 60K."

If this constraint is used as an integrity rules, then the following formula must be satisfied by the multilevel database:

(Level(Name)=Secret V Salary-value≦60K), Unclassified.

That is, if tuple level classification is provided, then the tuple (John, 70K) must be classified at the Secret level, whereas the tuple (James, 50K) could be classified at the Unclassified level. If this security constraint is used as a derivation rule, then it is used to deduce that any name whose salary is more than 60K is Secret. For example, if (John, 70K) is stored at the Unclassified level, then the derivation rule can be used during query time to deduce that John's level is Secret.

Some laws are better treated as integrity rules, while others are better treated as derivation rules. More research needs to be done before a characterization of security constraints can be obtained which will determine whether a constraint should be treated as a derivation rule or as an integrity rule.[24]

[24] Lock Data Views, Dwyer, P., E. Onuegbe, P. Stachour, and M. B. Thuraisingham, December 1988, "Query Processing in LDV—A Secure Database Management System," Proceedings of the 4th Aerospace Security Conference, Orlando, Fla.; Stachour, P., M. B. Thuraisingham, and P. Dwyer, October 1988, "Update Processing in LDV—A Secure Database Management System," Presented at the 11th National Computer Security Conference, Baltimore, Md., are designed in such a way that some security constraints are treated as deviation rules and others as integrity rules. However, that effort did not attempt to characterize the security constraints. A more recent approach to treating integrity constraints in multilevel databases is given in Burns, R., May 1990, "A Referential Secrecy Model," Proceedings of the 1990 Symposium on Security and Privacy, Oakland, Calif. This effort focuses on handling referential integrity for multilevel databases.

In section 7.2 we describe the issues involved in treating general laws either as integrity rules or as derivation rules. We only address state laws. Handling transition laws is a subject of future research. Our treatment of general laws examines the techniques proposed in Nicolas, J., and K. Yazdania, (Editors: H. Gallaire and J. Minker), 1978, "Integrity Checking in Deductive Databases," *Logic and Databases*, New York: Plenum Press, and adapts them for multilevel databases. Since Nicolas' work on integrity checking in databases, Nicolas, J., and K. Yazdania, (Editors: H. Gallaire and J. Minker), 1978, "Integrity Checking in Deductive Databases," *Logic and Databases*, New York: Plenum Press, several enhancements to various techniques have been proposed (see, for example, Nicolas, J., "Logic for Improved Integrity Checking in Relational Databases," 1982, *Acta Informatica*, Vol. 18, No. 3, pp. 227–253; Decker, H., 1986, "Integrity Enforcement on Deductive Databases," Proceedings of the Expert Database Systems Conference, Charleston, S.C.; Lloyd, J., 1987, *Foundations of Logic Programming*, (2nd Edition), Heidelberg, Germany: Springer Verlag). These enhancements should be useful in future investigations on integrity checking in multilevel databases.

7.2 Handling Integrity Constraints or General Laws

In this section we describe techniques for handling general laws. We focus only on state laws.

7.2.1 Integrity Rules for Multilevel Databases

Integrity rules are expressed as NTML formulas. They could be activated when data is updated.[25] Efficient techniques need to be developed in order to determine which of the integrity rules need to be activated during a database update operation.

[25] An updated operation is either an insert, delete or modify. A modify operation can be regarded as a delete followed by an insert.

The first step is to rewrite an integrity rule in Skolem form. This can be done as in the case of a first-order formula, except that the security level is also attached to the formula in Skolem form. Any NTML Skolem formula is a conjunct of clauses. Therefore, for the entire formula to be validated under an interpretation, each clause must be validated.[26] Note that a clause $$\neg P1 \vee \neg P2 \vee \ldots \vee \neg Pn \vee Q1 \vee Q2 \vee \ldots Qm, L0$$

can be written as an implication clause of the form $$((P1 \wedge P2 \wedge \ldots \wedge Pn \rightarrow Q1 \wedge Q2 \wedge \ldots Qn), L)$$

where m and n are not null at the same time. Any update to the database at level L or higher could activate such an implication clause if certain conditions are satisfied.

[26] An interpretation in this case is the multilevel database.

The following rules may be used to determine the implication clauses that need to be activated during database updates. Let the clause be of the form (P→Q, L) where P is P1 $\wedge$ P2 ... $\wedge$ Pn and Q is Q1 $\wedge$ Q2 $\wedge$ ... Qm.

(a) If a tuple is inserted at Level* $\geq$ L into a multilevel relation R, then the integrity rule (P→Q, L) is activated if:
  (1) (P→Q, L) is not negated at L*.
  (2) R is one of the Pis.

(b) If a tuple is deleted at level L* $\geq$ L from a multilevel relation R, then the integrity rule (P→Q, L) is activated if:
  (1) (P→Q, L) is not negated at L*.
  (2) R is one of the Qjs.

(c) If a tuple is modified at level L* $\geq$ L from a multilevel relation R, then the integrity rule (P→Q, L) is activated if:
  (1) P→Q, L) is not negated at L*.
  (2) R is either one of the Pis or one of the Qjs.

If an integrity rule is falsified, possible actions to be taken include the following:
  (1) Deny the operation. The user can also be told of the integrity rule that was falsified. He could then decide whether to accept the denial or whether to take some action. For example, he could try other updates first so that the denied update could be accepted later, or he could negate the integrity rule at his security level so that the update is accepted.
  (2) The second option is to automate some of the actions of the user as described in the first option. That is, the system could negate the integrity rule that was just violated at a higher level, or it could perform some other operations so that the integrity rule will not be violated later.

A problem is to determine which operations to perform in order for the rule not to be violated later. For a given rule $((P1 \wedge P2 \wedge \ldots \wedge Pn \rightarrow Q1 \wedge Q2 \wedge \ldots Qm), L)$, if an update to a Pi falsifies this rule, then the reason for this is that P1 $\wedge$ P2 $\wedge$ ... $\wedge$ Pn evaluates to True and Q1 $\wedge$ Q2 $\wedge$ ... Qm evaluates to false. Any operation that would either make P1 $\wedge$ P2 $\wedge$ ... $\wedge$ Pn false or Q1 $\wedge$ Q2 $\wedge$ ... Qm true would ensure that the integrity rule is satisfied. Note that if the request that was denied was attempted at level L*>L, and if any of the operations that have to be performed am at level L+ where L $\leq$ L+<L*, then the user at level L* cannot perform these operations.[27] In this case, the user could probably log in at the lower level L+ in order to perform the operation.[28]

[27] This will be ensured by the security policy enforced by the system.
[28] In general, this is not a desirable solution.

Several techniques have been developed which utilize "triggers" for automatic integrity recovery since they were introduced in SEQUEL2, Eswaran, K., and D. Chamberlin, 1975, "Functional Specification of a Subsystem for Database Integrity," Proceedings of the VLDB Conference, Framingham, Mass. Such techniques could also be adapted for multilevel databases.

7.2.2 Derivation Rules for Multilevel Databases

7.2.2.1 Overview

In this section we discuss derivation rules for multilevel databases. We assume that they coexist with the integrity rules. That is, some of the laws are treated as derivation rules and some others as derivation rules.

Nicolas and Gallaire, Nicolas, J., and H. Gallaire, (Editors: H. Gallaire and J. Minker), 1978, *Database: Theory vs Interpretation,* New York: Plenum Press, showed that if the derivation rules are horn clauses with one positive literal, then they can be safely used for deduction. In section 4 we showed that this was also the case for multilevel databases viewed through NTML. We could exploit the derivation rules either during the query operation or during the update operation. That is, the derivation rules are divided into two groups. Those derivation rules that are handled during the query operation are called the Query-Derivation rules, and those that are handled during database updates are called the Generation-Derivation rules.

Query-Derivation rules are used to deduce implicit information which is then included in the response to a query. Generation-Derivation rules are used to deduce information and make if explicit during database updates. For example, if the rule (P(x)→Q(x), S) is a query derivation rules, and the database is {(P(b), S), (Q(a), U)}, then, if a Secret user requests to find all values for Q, the rule is used to deduce Q(b). Therefore, the response is {Q(a), Q(b)}. If this rule is used as a generation-derivation rule and the database is {Q(a), (U)}, when (P(b),S) is inserted, the rule is used to make (Q(b),S) explicit. We discuss both types of derivation rules in the next two subsections.

7.2.2.2 Query-Derivation Rules

We discuss how the query-derivation rules are handled during query, insert and delete operations.

(1) Query Operation

Let a query be posed at level L. A deduction process is required to run at level L during the query operation in order to deduce the implicit information that can be derived using the query-derivation rules. If the derivation rules are handled in a manner to be stated below during the insert and delete operations, then the level of all the information derived should, in general, be dominated by L. The derived information will be part of the response.

If, however, the query-derivation rules are not handled appropriately during the insert and delete operations, then it could be possible for users to infer information from the legitimate responses that they receive. In this case, a deduction process should run at each security level L* $\geq$ L. The deduction process running at level L* should determine whether a user at level L* can infer information to which he is not authorized by seeing the response released at level L. If so, the response is not released at level L. Note that users could use several other inference strategies such as inductive reasoning, fuzzy reasoning and analogical reasoning in order to deduce information to which they are not authorized.[29] Such inferences cannot be handled by an NTML-based deduction process. Furthermore, such inferences are almost always made as a result of the query operation. Therefore, it is necessary to have an inference controller which handles such inferences as part of the query processor.[30]

[29] The various strategies are identified in Thuraisingham, M. B., September 1989, "Inference Problem in Database Security," M89-52, Volume 3, The MITRE Corporation, Bedford, Mass. (not currently in the public domain).

[30] The NTML extensions that we propose in section 8 could be used by such an inference controller for its reasoning.

(2) Delete Operation

When tuples are deleted, explicit or implicit extensions of relations may be affected. The relations that are affected need to be determined and appropriate integrity rules need to be activated.

Also, when a tuple is deleted, it could still be possible to derive this tuple using a query-derivation rule. For example, consider the database $\{(Q(a), U), (P(a), U)\}$ and the derivation rule $(P(x) \to Q(x), U)$. If $(Q(a), U)$ is deleted, then it can still be derived. If this is the case, appropriate actions need to be taken. One possible action would be to determine all ways to deduce the deleted tuple and to request operations that will ensure that the deleted tuple cannot be derived.

7.2.2.3 General-Derivation Rules

We discuss how the generation-derivation rules are handled during insert, delete, and query operations.

(1) Insert Operation

When a tuple is inserted at level L, the generation-derivation rules are used to deduce implicit information. The deduced information is then made explicit. Note that information can be deduced at different security levels. Therefore, there has to be a deduction process running at each security level.

(2) Delete Operation

Since deduced information is made explicit during the insert operation, the tuple to be deleted could be a derived tuple or it could be an original tuple.[31] If original information is deleted, then information that is derived from it may not be valid anymore. For example, if $(P(x) \to Q(x), U)$ is a generation-derivation rule and $(P(a), U)$ is some original information, then $(Q(a), U)$ will be derived. Deleting $(P(a), U)$ will cause $(Q(a), U)$ not be valid unless $(Q(a), U)$ is also explicitly asserted, or it can be derived some other way. Therefore, a deduction process running at level $L^* \geq L$ (where L is the level of the delete operation) should identify which of the derived information cannot be deduced by other means. Such derived information should also be deleted.

[31] By original tuple, we mean a tuple that has not been derived using generation rules.

If derived information is deleted, then the generation-derivation rule may not be valid anymore. For example, if the database is $\{O(a), U)\}$, $(P(x) \to Q(x), U)$ is a generation-derivation rule, and $(Q(a), U)$ is derived information. Then, if $(Q(a), U)$ is deleted, the generation-rule is falsified. Therefore, $(P(a), U)$ should also be deleted in order for the generation-rule not to be invalidated. A deduction process, which will determine the sequence of operations that have to be performed, is necessary in order for the generation-derivation rules not to be invalidated.

As stated earlier, we run into problems if the derivation rules and the database data are at different security levels. For example, let $\{(P(a), U)\}$ be the database, $(P(x) \to Q(x), S)$ be a generation-derivation rule, and $(Q(a), S)$ be derived information. Then, if $(Q(a), S)$ is deleted, the generation-rule is falsified. Therefore, $(P(a), U)$ should also be deleted in order for the generation-rule not to be invalidated. However, a Secret user cannot delete this information as it is classified at the Unclassified level. A solution to this problem would be for the Secret user to insert the assertion $(\neg P(a), S)$ at the Secret level.

(3) Query Operation

The generation-derivation rules will make all the deduced information explicit during the insert operation. When the database is queried, all of the information will be present in the extensional database. Therefore, there is no need for a deduction process to operate during query processing. Note that if the inference problem has to be handled, then an inference controller should be part of the query processor.[32]

[32] See the discussion for the query operation under query-derivation rules.

Section 8

Logics for Multilevel Knowledge Base Management Systems 8.1 Overview

First-order logic (or classical logic) has received criticisms for its use in automated knowledge processing. As stated in Frost, R., 1986, *Introduction to Knowledge Base Systems,* London, England: William Collins & Sons, the most common criticisms are:

(1) Classical logic is not expressive enough;

(2) Classical logic cannot handle incomplete, uncertain, inconsistent, and imprecise knowledge;

(3) Algorithms, derived from classical logic, for manipulating knowledge are not efficient.

Due to these criticisms, several other logics have been developed over the years for knowledge processing. These logics have been derived from classical logic. Each logic has a well-defined language for representation, a model theory, and a proof theory. These logics, which are called nonclassical logics, include the following:

(1) Situational logic, McCarthy J., and P. hayes, 1969, (Editor: B. Meltzer, and D. Michie), "Some Philosophical Problems from the Standpoint of Artificial Intelligence," *Machine Intelligence* 4, Edinburgh, Scotland: Edinburgh University Press (2) Nonmonotonic logic. McDermott, and Doyle, J., 1980, "Nonmonotonic Logic," *Artificial Intelligence Journal,* Vol. 12, pp. 41–72

(3) Fuzzy logic, Zadeh, L., 1983, "Common Sense Knowledge Representation Based on Fuzzy Logic," *IEEE Computer,* Vol. 16, No. 10, pp. 61–65

(4) Object logic, Zaniolo, C., 1984, "Object-Oriented Programming in Prolog," Logic Programming Symposium (5) Temporal logic, Lundberg, B., 1982, "An Axiomatization of Events," *BIT,* Vol. 22, pp. 291–299

(6) Modal logic, Snyder, D., 1971, *Modal Logic and its Applications,* New York: Van Nostrand (7) Epistemic logic, Konolige, K., 1982, "Circumscription Ignorance," Proceedings of the AAAI Conference, Pittsburgh, Pa.

(8) Many-sorted logic, Enderton, H., 1972, *A Mathematical Introduction to Logic,* New York, N.Y.: Academic Press (9) Many-valued logic, Belnap, N., (Editors: J. Dunn and G. Epstein), 1977, "A Useful Four-Valued Logic," *Modern Uses of Multiple Valued Logic,* D. Reidel Publishing, Holland

(10) Higher-order logic, Church, A., 1940, "A Formulation of a Simple Theory of Types," *Symbolic Logic,* Volume 5, No. 1, pp. 56–68

(11) Intensional logic, Montague, R., (Editor: K. Hintikka), 1973, "The Proper Treatment of Quantification in Ordinary English," *Approaches to Natural Languages,* Dordrecht, Germany An excellent introduction to some of these logics is given in Frost, R., 1986, *Introduction to Knowledge Base Systems,* London, England: William Collins & Sons. A more extensive treatment of nonclassical logics is given in Turner, R., 1984, *Logic for Artificial Intelligence,* Ellis Horwood: Chichester, England. Each logic provides its own contribution to knowledge processing. It is yet to be determined as to which logic is most appropriate for knowledge-based applications. A logic which encompasses all of the features of the various nonclassical logics would be ideal. But such a logic is yet to be developed.

We are interested in developing logics for knowledge processing in a multilevel environment. NTML, which extends classical logic, was developed for the purpose of data processing in a multilevel environment. That is, NTML handles multiple security levels and can reason nonmonotonically across security levels. It also has the notion of types incorporated into it, and, therefore, it provides some of the advantages of higher-order logics. However, NTML cannot handle incomplete, uncertain, or imprecise knowledge, nor can it handle nonmonotonic reasoning across time. Therefore, NTML does not support many of the features essential for knowledge processing in a multilevel environment. That is, we need extensions for NTML in order to support these features. Therefore, in this paper we attempt to extend NTML based on various nonclassical logics that have been proposed. Since there is no universally accepted logic for knowledge processing, we do not attempt to develop such a logic for multilevel knowledge processing. Instead, our approach is to examine each nonclassical logic that has been developed and suggest an extension to NTML based on such a logic.

In section 8, we discuss six extensions to NTML. The first extension, which we call Situational-NTML, handles the storage and manipulation of knowledge, which represents a changing multilevel universe. The second extension, which we call Nonmonotonic-NTML, has the capability of invalidating previous conclusions due to the addition of assertions.[33] The third extension, which we call Fuzzy-NTML, handles uncertain knowledge in a multilevel environment. The fourth extension, which we call Object-NTML, describes how an object-oriented approach could be taken for multilevel knowledge processing. The fifth extension, which we call Temporal-NTML, incorporates the notion of time in a multilevel environment. The sixth extension, which we call Modal-NTML, handles statements in a multilevel environment, which are in subjunctive moods rather than in the indicative mood.

[33] Note that NTML is already nonmonotonic because it provides the support for reasoning nonmonotonically across security levels. But it does not support nonmonotonic reasoning within a security level.

From a preliminary analysis of the other nonclassical logics, it appears that we can develop other extensions to NTML also. These include logics such as Epistemic-NTML, Many-sorted-NTML, Many-valued-NTML, Higher-order-NTML[34] and Intensional-NTML. Describing all these extensions is beyond the scope of this paper.

[34] As stated earlier, NTML incorporates the notion of types and, therefore, has some of the advantages of higher-order logic. The work described in Thuraisingham, M. B., April 1990, "Multilevel Type Theories for Object-Oriented Systems," Presented at the Object-Oriented Database Security Workshop, Karlsruhe, West Germany, on multilevel type theories could be useful in developing a Higher-Order-NTML.

The organization of this section is as follows. In section 8.2 we discuss Situational-NTML. Nonmonotonic-NTML is discussed in section 8.3. Fuzzy-NTML is described in section 8.4. Object-NTML is discussed in section 8.5. Temporal-NTML is discussed in section 8.6. In section 8.7, we discuss Modal-NTML. Much of the discussion on nonclassical logics has been obtained from Frost, R., 1986, *Introduction to Knowledge Base Systems,* London, England: William Collins & Sons.

8.2 Situational-NTML

Situational logic was developed for applications where there is a need for storing and manipulating knowledge in a changing universe. We are interested in the storage and manipulation of knowledge in a multilevel changing universe, For this purpose we propose extensions to NTML based on concepts in situational logic. We call this extended logic Situational-NTML. We briefly discuss the essential points in Situational-NTML.

In Situational-NTML, all NTML predicates are assigned an extra argument which denotes the situation in which the formula is true. That is, $$(ON(b1,b2,s),L)$$

is a formula which is asserted at security level L and in situation s. It asserts that block b1 is on block b2. Note that, since ON is an NTML predicate, it also has a security level L' such that $$L' \leq L.$$

A situation s1 is transformed into a situation s2 by the occurrence of an event. In situational logic, situations and events are related by a relation R where R(e,s) is the situation that results from s by the occurrence of event e, In Situational-NTML, we assign security levels to events. For example, if an event c is assigned a level L, then can occur at all levels $\geq L$. Following is a formula of Situational-NTML.

$$(\forall X((ON(b1,b2,s),L1) \land \neg ON(xmb3ms),L2) \land L1 \geq L2 \rightarrow (ON(b1,b3,R(move((b2,b3),L2)s)),L1)),L)$$

The entire formula is asserted at level L. The formula states that if block b1 is on block b2 in situation s and level L1, and it is not the case that b3 has any block on top of it in situation s and level L2, and if $L1 \geq L2$, then one can infer that if s' is the situation that arises from s when block b2 is moved on top of b3 at level L2, then block b1 is on top of block b3 in situation s' at level L1.

The Situational-NTML formula given earlier only states that block b1 is on block b3 in situation s' at level L1. It does not say anything about the other blocks. A solution that has been proposed to handle this problem is to write assertions which state that a block remains static unless it is moved. These assertions are called frame laws. The problem of determining adequate collections of these frame laws is called the frame problem. For a move detailed discussion on these assertions and the frame problem, we refer to Hayes, P., "The Logic of Frames," (Editors: B. Webber and N. Nilsson), 1981, *Readings in Artificial Intelligence,* Tioga Publishing, Palo Alto, Calif.

The following should be noted.

(1) $(A(x1,x2,x3, \ldots xn,s),L$ does not necessarily imply that $(A(x1,x2,x3, \ldots xn, s'),L)$. That is, a predicate could be true in situation s and level L, and it could be false in situation s' and level L.

(2) (A(x1,x2,x3, ... xn,s),L) does not necessarily imply that (A(x1,x2,x3, ... xn,s),L'). That is, a predicate could be true in situation s and level L, and it could be false in situation s and level L'.

The rules of inference of Situational-NTML are those of NTML. Future work should include developing proof and model theories for Situational-NTML.

8.3 Nonmonotonic-NTML 8.3.1 Nonmonotonic Reasoning

In nonmonotonic logic, adding new assertions to a theory may invalidate previous conclusions. As stated in Frost, R., 1986, *Introduction to Knowledge Base Systems*, London, England: William Collins & Sons, the reasons for nonmonotonicity include the following:

(1) In the presence of incomplete knowledge, default assumptions need to be made. These assumptions may be invalidated when knowledge is available later.

(2) In reality the universe is changing. Therefore, a statement which is true at one instance may be false the next instance.

We are interested in nonmonotonicity that arises in a multilevel universe or reasoning in a multilevel environment. NTML is a nonmonotonic logic. But its nonmonotonicity is with respect to different assumptions or beliefs at different security levels. That is, a statement which is believed to be true at a level L may be believed to be false at all levels which dominate L. NTML does not have the capability of reasoning in the presence of incomplete knowledge, nor does it provide support for a multilevel changing universe. In section 8.3.2 we discuss the essential points in extending NTML to provide the capability for default reasoning. We call the extended logic Nonmonotonic-NTML.[35] The extensions are based on a particular nonmonotonic logic developed by McDermott and Doyle, McDermott, and Doyle, J., 1980, "Nonmonotonic Logic," *Artificial Intelligence Journal*, Vol. 12, pp. 41–72, and will be given in section 8.3.3. First we provide a brief overview of nonmonotonic reasoning.

[35] Note that Nonmonotonic NTML is read "Nonmonotonic Typed Multilevel Logic."

Suppose the following beliefs are held at security levels L1, L2, and L3 where L3 is the least upper bound of L1 and L2.

(1) Ozzie is a bird (L1);

(2) (Ozzie is a bird $\wedge$, not known Ozzie cannot fly $\rightarrow$(by default) Ozzie can fly) (L2);

(3) Beliefs (1) and (2) hold at level L3.

One can conclude at L3 that Ozzie can fly if it is not known at level L3 that Ozzie cannot fly. However, the knowledge base does not have any beliefs on whether Ozzie cannot fly. In NMTL we assume that an elementary proposition is false if it is not explicitly asserted to be true. If "Ozzie cannot fly" is taken to be an elementary proposition, and if at level L it is not explicitly asserted that "Ozzie cannot fly," then at level L one can assume that "Ozzie can fly." However, in Nonmonotonic-NTML we modify this reasoning slightly. That is, if an elementary proposition X is not explicitly or implicitly asserted to be true at level L, then we assert the following: "It is not known that X holds." This does not mean that X does not hold. This type of reasoning is default reasoning as assumptions are made due to incomplete knowledge.

In the example considered here, we can assume at all security levels that "it is not known that Ozzie cannot fly." From belief (2), we can infer at level L3 that Ozzie can fly. Therefore, the belief set at level L3 consists of the following:

(1) Ozzie is a bird;

(2) (Ozzie is a bird $\wedge$ not known Ozzie cannot fly→(by default) Ozzie can fly);

(3) Ozzie can fly.

Later at level L3, if it is asserted that "Ozzie cannot fly," then the belief set at level L3 is modified to the following:

(1) Ozzie is a bird;

(2) (Ozzie is a bird $\wedge$ not known Ozzie cannot fly→(by default) Ozzie can fly);

(3) Ozzie cannot fly.

Reasoning in a changing multilevel universe is slightly different to default reasoning. Here one has to deal with out-of-date knowledge. For example, consider the following:

(1) At level L1, it is asserted that Ozzie is a bird and that Ozzie can fly;

(2) After asserting (1), it is asserted at level L2 that Ozzie has escaped;

(3) Finally, it is asserted at level L3 that Ozzie has had his wings clipped between the times beliefs (1) and (2) were asserted. (Note that L3= l.u.b.(L1,L2)).

Assuming that (1) and (2) are not retracted at level L3, before (3) is asserted, it will be concluded that Ozzie escaped because he flew away. This conclusion is not correct because of reasoning with out-of-date knowledge. However, after (3) is asserted, the previous conclusion has to be retracted; and a new conclusion that Ozzie escaped by some other means will be formed.

8.3.2 An Example of Nonmonotonic-NTML

In this section we describe an example of Nonmonotonic-NTML that is based on McDermott and Doyle's nonmonotonic logic, McDermott, and Doyle, J., 1980, "Nonmonotonic Logic," *Artificial Intelligence Journal*, Vol. 12, pp. 41–72. This logic has provided the foundations for building truth maintenance systems, Doyle, J., "A Truth Maintenance System," *Artificial Intelligence Journal*, Vol. 12, pp. 231–272; deKleer, J., 1986, "Assumption-Based Truth Maintenance," *Artificial Intelligence Journal*, Vol. 28; Russinoff, D., 1989, (Editor: W. Kim, and F. Lochovsky), "Proteus: A Frame-Based Nonmonotonic Inference System," Object-Oriented Concepts, Databases, and Applications, ACM Press. Truth maintenance systems support nonmonotonic reasoning by maintaining consistency among a set of beliefs which are generated by the knowledge base system which it supports. This section will describe briefly the essential points of Nonmonotonic-NTML. The extensions to Doyle's truth maintenance system to function in a multilevel environment will be given in section 8.3.3.[36]

[36] Several improvements have been proposed to Doyle's truth maintenance system. Examples include DeKleer's Assumption-based truth maintenance system and the Proteus truth maintenance system (developed at MCC, Russinoff, D., 1989, (Editor: W. Kim, and F. Lochovsky), "Proteus: A Frame-Based Nonmonotonic Inference System," Object-Oriented Concepts, Databases, and Applications, ACM Press). We are at present investigating the extensions that need to be made to Proteus to function in a multilevel environment.

McDermott and Doyle have extended classical logic by adding a modal operator M, which means "consistent." That is, MR means R is consistent with everything that is believed.[37] For example, consider the following formulas of a nonmonotonic logical theory.

(1) $\forall x((x \in$ birds) $\wedge M(x$ has ability flying)$\rightarrow$(x has ability flying)

(2) (Ozzie $\in$ birds)

The first formula states that, if for all x, x is a bird, and that x can fly is consistent with what we believe, then we can deduce that x can fly. The second formula state that Ozzie is a bird. If we believe that a bird can fly, then we can deduce that Ozzie can fly. Now, later if we find out that Ozzie cannot fly, then Ozzie can fly is not consistent with what we believe. This is the essence of the logic developed by McDermott and Doyle. They have also developed a proof procedure for their logic based on the tableau proof method of classical logic.[38]

[37] Modal-NTML has been discussed in section 7.6.
[38] For a discussion on the tableau proof method for classical logic we refer to Zeman, J., 1973, *Modal Logic: The Lewis Modal Systems*, Oxford University Press, Oxford, England. This proof method was a consequence of the sequent logic by Gentzen, Gentzen, G., 1934, "Untersuchungen uber das logische Schliessen," *Mathematische Zeitschrift*, Vol. 39, pp. 176–210 and 405–431.

Nonmonotonic-NTML is formed from NTML by adding the modal operator M and the following additional deduction rule.

"If R is consistent with everything that is believed at security level L, if L* is the last security level that dominates L, and if the negation of R is not believed at level L*, then R is consistent with everything that is believed at level L*."

In the example considered above, if the formulas (1) and (2) are asserted at level L, if Ozzie can fly is consistent with everything that is believed at Level L, and if Ozzie cannot fly is not believed at level L*, then one can deduce at levels L and L* that Ozzie can fly.

In order to extend McDermott and Doyle's proof procedures for a multilevel environment, we need to first extend the tableau proof procedures for a multilevel environment.[39] Future work will include developing proof procedures for Nonmonotonic-NTML.

[39] Note that the discussions in sections 3 and 5 have focussed only on developing proof procedures for a multilevel environment based on the rules MP and Resolution.

8.3.3 A Multilevel Truth Maintenance System

In this section we discuss the essential points in extending Doyle's Truth Maintenance System (TMS) to a multilevel environment.[40] We call such a TMS a Multilevel TMS (MTMS).[41] The MTMS discussed here is based on the Nonmonotonic-NTML described earlier.

[40] Doyle's TMS is based on nonmonotonic logic developed in McDermott, and Doyle, J., 1980, "Nonmonotonic Logic," *Artificial Intelligence Journal*, Vol. 12, pp. 41–72.
[41] In Garvey and Lunt's work on multilevel security for knowledge-based systems, Garvey, T., and Lunt, T., April 1990, "Multilevel Security for Knowledge-Based Systems," Presented at the Object-Oriented Database Security Workshop, Karlsruhe, West Germany, it is suggested that a truth maintenance system be used for selecting a belief among a set of beliefs of different security levels. However, the example which follows the suggestion does not illustrate how such a system could be used for this purpose. The MTMS that we describe here provides a way for consistently managing beliefs within a security level in nonmonotonic worlds. It does not, however, provide a way for selecting a belief among a set of beliefs a different security levels. NTML provides the capability of performing such a selection.

In an MTMS, statements of belief are called 'nodes.' Each node (or statement of belief) is assigned a security level. If a node is assigned a security level L, then it can be IN or OUT with respect to any level $\geq$L. A node is IN with respect to L if it is believed to be true at L. Otherwise the node is OUT. Each node at level L has a set of justifications linked to it with respect to each security level that dominates L. Each justification at a level L*$\geq$L represents a justification representing one way in which the node (i.e., the belief which corresponds to it) may be true. If a justification at level L* is valid, then, unless that justification is explicitly made invalid at Level L (L is the least level which dominates L*), it is also assumed valid at level L*. A node at level L is IN with respect to level L*$\geq$L if it has at least one justification valid at L*. If all justifications at Level L* are not valid, then the node is OUT with respect to L*.

Doyle's TMS considers two kinds of justifications: support list justifications and conditional proof justifications. We only discuss support list justifications for a MTMS. Future work should include adapting conditional proof justifications for a MTMS.

In the case of support list justifications, the justifications at level L*$\geq$L of a node N at level L consists of a support list which identifies those nodes which are required to be IN with respect to L* and those nodes which are required to be OUT with respect to L* in order for that particular justification of N to be valid with respect to L*.

We illustrate support list justification with an example. In this example, we assume that there are only two security levels, Unclassified (U) and Secret (S). Table 17 shows the MTMS nodes and a justification at the Unclassified level. This table is interpreted as follows:

TABLE 17

Support List Justification for an MTMS at the Unclassified Level

| | | Justification | |
|---|---|---|---|
| | Status | IN | OUT |
| 1. Ozzie is a bird. | IN | | |
| 2. Ozzie can fly. | IN | 1 | 3 |
| 3. Ozzie cannot fly. | OUT | 4 | |
| 4. Ozzie has clipped wings. | OUT | | |

The nodes are numbers 1 through 4. Each node has the following assertion or belief:
Node 1 has the assertion "Ozzie is a bird." This assertion has the status IN and does not have any justifications associated with it.
Node 2 has the belief "Ozzie can fly." In order for this belief to be IN, node 1 must be IN and node 3 must be OUT. Node 1 is IN. We will see that node 3 is OUT. Therefore, Node 2 is IN. That is, Ozzie can fly is consistent with everything that is believed with respect to the Unclassified level.
Node 3 has the belief "Ozzie cannot fly." In order for this belief to be true, node 4 must be IN. We will see that node 4 is OUT. Therefore Node 3 is OUT.
Node 4 is a previous assertion "Ozzie has clipped wings." It has the status OUT because it must have been retracted earlier.

Table 18 shows the assertions, beliefs, and justifications at the Secret level. Here there are two justifications that Could possibly be associated with a node. This table is interpreted as follows:

TABLE 18

Support List Justification for an MTMS at the Secret Level

| | | Justification 1 | | Justification 2 | |
|---|---|---|---|---|---|
| | Status | IN | OUT | IN | OUT |
| 1. Ozzie is a bird. | IN | | | | |
| 2. Ozzie can fly. | OUT | 1 | 3 | | |
| 3. Ozzie cannot fly. | IN | 4 | | 5 | |
| 4. Ozzie has clipped wings. | OUT | | | | |
| 5. Ozzie is a penguin. | IN | | | | |

Node 1 has the assertion "Ozzie is a bird." This assertion has the status IN and does not have any justifications associated with it. Note that node 1 is assigned the Unclassified level. Its status has not changed from the Unclassified world.
Node 2 has the belief "Ozzie can fly." In order for this belief to be IN, node 1 must be IN and node 3 must be OUT. Node 1 is IN. We will see that node 3 is also IN. Therefore, Node 2 is OUT. That is, Ozzie can fly is not consistent with everything that is believed with respect to the Secret level.

Note that node 2 is assigned the Unclassified level. Its status has changed from the Unclassified world.

Node 3 has the belief "Ozzie cannot fly." In order for this belief to be true, either node 4 must be IN or node 5 must be IN. We will see that node 5 is IN. Therefore Node 3 is IN. That is, Ozzie cannot fly is consistent with everything that is believed with respect to the Secret level. Note that node 3 is assigned the Unclassified level. Its status has changed from the Unclassified world.

Node 4 is a previous assertion "Ozzie has clipped wings." It has the status OUT because it must have been retracted earlier. Note that node 4 is assigned the Unclassified level. Its status has not changed from the Unclassified world.

Node 5 is an assertion "Ozzie is a penguin." It has the status IN. Note that node 5 is assigned the Secret level and is therefore not visible at the Unclassified level.

Note that, if, at a later time, the assertion that "Ozzie is a penguin" is retracted in the Secret world, then the status of node 5 becomes OUT. This would change the status of node 3 to be OUT. This would in turn change the status of node 2 to be IN. It should also be noted that an MTMS does not create justifications. The justifications are provided by the multilevel knowledge base management system that the MTMS supports. The MTMS maintains a consistent set of beliefs with respect to all security levels.

8.4 Fuzzy-NTML

Fuzzy logic was developed primarily as a tool for reasoning in the midst of uncertain information.[42] We have in the past investigated the use of fuzzy logic, Zadeh, L., 1985, "Fuzzy Sets," *Information and Control*, Vol. 8, pp. 338–353; Zadeh, L., 1983, "Common Sense Knowledge Representation Based on Fuzzy Logic," *IEEE Computer*, Vol. 16, No. 10, pp. 61–65, to augment multilevel relational database systems. For example, we have described how an inference engine based on fuzzy logic could be used to detect inferences in a multilevel environment, Thuraisingham, M. B., December 1989, "Secure Query Processing in Intelligent Database Management Systems," Proceedings of the 5th Aerospace Computer Security Applications Conference, Tuscon, Ariz. However, these efforts did not provide any support to develop a fuzzy logic specifically for use in a multilevel environment. In this section we describe our ideas on developing such a logic. We call this logic Fuzzy-NTML.

[42] We have investigated other approaches to reasoning under uncertainty in a multilevel environment. These include probability theory, Dempster Schaefer's theory of evidence, plausibility theory, incidence calculus, and inference networks. This investigation will be described elsewhere. However, this investigation does not develop multilevel models for reasoning under uncertainty, whereas the purpose of Fuzzy-NTML is to develop such a model. An excellent survey of the various uncertainty theories is given in Frost, R., 1986.

Fuzzy-NTML extends NTML by assigning a fuzzy value with each formula. That is, each NTML formula is assigned a fuzzy value between 0.0 and 1.0. If a formula is not explicitly assigned a fuzzy value, then its fuzzy value could be computed. Some rules to assign fuzzy values to formulas are as follows:

If F1 and F2 are two NTML formulas with fuzzy values r1 and r2, respectively, then F1 $\wedge$ F2 has a fuzzy value of MIN(r1,r2).

F1 $\vee$ F2 has a fuzzy value of MAX(r1,r2).

$\neg$F1 has a fuzzy value of 1−r1.

If F2 is deduced from the formulas F1 and F1→F2, and if F1 and F1→F2 have fuzzy values r1 and r3, respectively, then F2 has a fuzzy value of r2 which is determined as follows:

If 1−r1=r3, the r2≤r3 (i.e., r2 could be any value which is less than r3).

If 1−r1<r3, then r2=r3.

*Introduction to Knowledge Base Systems*, London, England: William Collins & Sons.

Note that 1−r1 cannot be greater than r3, as F1→F2 is equivalent to $\neg$F1 $\vee$ F2.

The first step towards developing a fuzzy logic is to consistently assign fuzzy values to the various formulas. For example, there could be several ways to deuce a formula F. Each deduction should result in the same fuzzy value assigned to the formula F.

The rules that we have proposed to assign fuzzy values can be applied within a security level. The rule DASL can be extended to a fuzzy environment as follows:

"If F is a formula with fuzzy value r at level L, and it is not the case that either (1) the formula is negated at level L* which is the least level greater than L, or (2) the fuzzy value of F is not changed at level L*, then F is a formula with fuzzy value r at level L*.

Future work should include developing proof procedures for Fuzzy-NTML.

8.5 Object-NTML 8.5.1 Overview

The object-oriented approach to knowledge base management systems has received much attention lately (see, for example, Tokoro, M., and Y. Ischikawa, 1988, (Editors: A. Bond and L. Gasser), "An Object-Oriented Approach to Knowledge Systems," *Readings in Distributed Artificial Intelligence*, Morgan Kaufmann; McCarthy, D., and Dayal, U., 1989, "An Architecture of an Active Database Management System," Proceedings of the ACM SIGMOD Conference, Portland, Oreg. An advantage of the object-oriented approach is its ability to represent complex knowledge structures. A disadvantage of the object-oriented approach is its inability to make deductions. As a result, object-oriented systems have been extended with inferencing capabilities, Zaniolo, C., 1984, "Object-Oriented Programming in Prolog," Logic Programming Symposium; Sheu, P., 1989, "Describing Semantic Databases with Logic," *Journal of Systems and Software*, Vol. 9, No., pp. 19–28.

Recently, some efforts are underway to develop multilevel knowledge-based system using the object-oriented approach, Millen, J., and Lunt, T., April 1990, "Security for Knowledge-Based Systems," Presented at the Object-Oriented Database Security Workshop, Karlsruhe, West Germany; Garvey, T., and Lunt, T., April 1990, "Multilevel Security for Knowledge-Based Systems," Presented at the Object-Oriented Database Security Workshop, Karlsruhe, West Germany. Suggestions for augmenting a multilevel object-oriented database system with inferencing capability is described in Thuraisingham, M. B., December 1989, "Secure Query Processing in Intelligent Database Management Systems," Proceedings of the 5th Aerospace Computer Security Applications Conference, Tuscon, Ariz. However, none of these efforts has focused on developing an object-logic for a multilevel environment. In this section we discuss the essential points in developing such a logic. The object-logic that is of interest to us is that developed by Sheu, Sheu, P., 1989, "Describing Semantic Databases with Logic," *Journal of Systems and Software*, Vol. 9, No., pp. 19–28. We extend this logic for a multilevel environment in section 8.5.2. First we describe the essential points of this object-logic.[43]

[43] Several other object logics have been developed. Notable among these is Zaniolo's Object-Prolog, Zaniolo, C., 1984, "Object-Oriented Programming in Prolog," Logic Programming Symposium. While Zaniolo's logic is based on Prolog, Sheu's logic is based on first-order logic.

In Sheu's logic, the notions of object instance, object class, subclass, attributes, attribute values, and methods are introduced. They have the usual meaning as in any object-oriented data model, Banerjee, J., 1987, "A Data Model for Object-Oriented Applications," *ACM Transactions on Office Information Systems,* Vol. 5. The following additional predicates are also introduced:

class(a) is true if a is an object class.

instance_of(a,b) is true if object a is an instance of class b.

subclass_of(a,b) is true if class a is a subclass of class b.

attributes(a,b) is true if b is an attribute of objects in class a.

attribute_value(a,b,c) is true if object a has value c for its attribute b.

c: a(x1,x2, ... xr,y1,y2, ... yp) is true if a is a method executed on object (or class c.

f(x1,x2, ... xn) is true if (x1,x2, ... xn) is a member of the user defined predicate f.

8.5.2 An Object-NTML

In this section we propose extensions to NTML based on the object logic described in section 8.5.1.

In addition to the NTML constructs described in section 3, the following additional constructs are also supported:
class object,
instance object,
attributes,
attribute values, and
methods.

Each construct is assigned a security level. The predicates instance_of, subclass, attributes, attribute_value, and class, method are assigned the level system-low. User-defined predicates are treated, as in the case of NTML. The following are possible security properties that could be enforced:

If Instance_of(a,b), the Level(a)$\geq$Level(b).

If subclass_of(a,b), then Level(a)$\geq$ Level(b).

If attributes(a,b), then Level (a)$\geq$Level(b).

If attribute_value(a,b,c), then Level(c)$\leq$Level(b) and Level(b)$\geq$Level(a).

If c: a(x1,x2 ... xr;y1,y2, ... yp), then Level(a)$\geq$Level(c).

The variables of NTML are extended to include class variables, instance variables, and method variables. Similarly, the constants of NTML are extended to include class constants, instance constraints, and method constraints. Each variable and constant belongs to a type. The security properties for variables, constants, and types are defined as in the case of NTML.

NTML semantics is extended for Object-NTML semantics as follows:

If C is a class object of level L, then it has interpretations at all levels $\geq$L. Each interpretation at level L* will consist of a set of entities. The security level of each entity is dominated by the level L*. An entity can be regarded as an interpretation of an instance object of the class.

If O is an instance object of class C and the level of O is L, then it has an interpretation at all levels $\geq$L. Its interpretation at level L* is an entity which is dominated by L* and which belongs to the set S which is the interpretation of C at L*.

If A is an attribute of class C, the level of A is L, then A has interpretations at all levels which dominate L. At level L*, the interpretation of A is a property of the entities belonging to the set S which is the interpretation of class C at L*.

If V is the value of an attribute A of object O and the level of V is L, then V has interpretations at all levels which dominate L. At level L*, its interpretation is defined to be the entity which is the value of the property P of entity G where P and G are the interpretations of A and O, respectively, at level L*.

If M is a method defined on class C, and M is assigned level L, then M has interpretations at all levels which dominate L. At level L*, its interpretation is the procedure which is defined on the entities of set S which is the interpretation of the class C at level L*.

Object-NTML will have the rules of inference of object logic. In addition, it also enforces the rule DASL. That is, if F is a formula of Object-NTML which is true level L and if F is not negated at level L* where L* is the least level which dominates L, then F is also true at level L*. Future work should include developing proof procedures for Object-NTML.

8.6 Temporal-NTML

Temporal logics that have been developed in the past include those that incorporate the notion of time into classical first order logic, Lundberg, B., 1982, "An Axiomatization of Events," *BIT,* Vol. 22, pp. 291–299, and those that incorporate modal operators for representing notions such as 'always' and 'sometimes', Recher, N., and Urquhart, A., 1971, "Temporal Logic," Heidelberg, Germany: Springer Verlag. The temporal logics which are involved with modal operators can be regarded as modal logics. Our focus in this section is on temporal logics of the former type; that is, those that incorporate the notion of time in classical first-order logic. Modal logics will be addressed in section 8.7.

Lundberg, Lundberg, B., 1982, "An Axiomatization of Events," *BIT,* Vol. 22, pp. 291–299, has described a temporal logic where classical first order logic is used to reason about time by considering time points like any other entities in the domain of a relational structure. Two predicates 'et' and 'ss' are defined, where et(t1,t2) is true if time point t1 is earlier than time point t2, and ss(t1, t2) is true if time point t2 is the immediate successor of time point t1. The predicates 'et' and 'ss' have as their interpretations the relations 'ET' and 'SS' respectively. A third predicate 'tpt' is also defined where tpt(x) means that x is a time point.

We can define Temporal-NTML, which extends NTML, based on the temporal logic developed by Lundberg. In Temporal-NTML, each NTML formula has an additional argument which is the time point in which the formula was asserted. For example, let AGE be a predicate which is classified at the Unclassified level. Then (AGE(John, 20, 1987), Secret) implies that at the Secret level it is asserted that John is of age 20 in 1987.

An advantage of incorporating the notion of time into NTML is that the most recent version of an assertion can be selected instead of the version which is assigned the highest level which is dominated by the level of the requesting user. This is because, in some instances, it may be the case that the most accurate version is reflected at the lower security level, while the assertion at the higher security level may be outdated. Therefore, the rule DASL of NTML could be modified as follows:

"If a formula F is asserted at level L and time point t, and if F is not negated at level L* between the times t and t*$\geq$t, where L* is the least level which dominates L, then F is asserted true at level L* at time points t' where t$\leq$t'$\leq$t*."

Future work should include developing proof procedures for Temporal-NTML.

8.7 Modal-NTML 8.7.1 Overview

The development of modal logics have contributed significantly to automated knowledge processing. They have had such great impact on the development of knowledge base management systems that adapting them for a multi-level environment deserves special consideration. It should be noted that several other logics that have been developed, such as temporal logics, epistemic logics and nonmonotonic logics,[44] can be regarded as modal logics as they involve modal operators. In section 8.7.2 we can be regarded as modal logics as they involve modal operators. In section 8.7.2 we briefly discuss ways of extending NTML to a particular Modal-NTML. First, we provide an overview of the various types of modal logics that have been proposed.

[44] The nonmonotonic logic of McDermott and Doyle can be regarded as Modal-logic.

Many of the logics that we have considered so far can be regarded as truth functional logics. This is because the statements of these various logics are in indicative mood because they are assigned truth values. Modal logics, on the other hand, deal with statements which are in subjunctive moods. These statements assert things like what ought to be, what is possibly or necessarily true, what is hoped to be, what will be true in the future, what was true in the past, etc. Various types of modal logics have been proposed. These include logics based on alethic modality, temporal modality, denotic modality and epistemic modality.

Alethic modality is concerned with the notions of "necessity" and "possibility". Our discussion on Modal-NTML will be based on alethic modality. Temporal modality interprets the alethic modal operators 'necessary' and 'possible' as 'always' and 'sometimes,' respectively. Other temporal logics include those which use tense operators, such as 'it has been,' 'it will be,' 'it will always be,' and 'it has always been.' Denotic modality contains modal operators such as 'it is obligatory' and 'it is permissible.' Epistemic logic is concerned with model operators, such as 'it is known that' and 'it is believed that.'[45]

[45] Autoepistemic logics, Moore, R., 1985, "Semantic Considerations on Nonmonotonic Logic," *Artificial Intelligence Journal*, Vol. 25, No. 1, which reason about beliefs, has formed the basis for the development of certain nonmonotonic modal logics. An example is Konolige's logic, Konolige, K. (Editors: M. Reinfrank, J. deKleer, and M. Ginsberg) 1988, "Hierarchical Autoepistemic Theories for Nonmonotonic Reasoning: Preliminary Report," *Nonmonotonic Reasoning*, Heidelberg, Germany: Springer Verlag, for hierarchical knowledge structures. It has been suggested that this logic could be used for reasoning in a multilevel environment, Garvey, T., April 1990, *Private Communication*, Karlsruhe, West Germany. However, more work needs to be done before it can be determined how such a logic could be adapted.

8.7.2 A Modal-NTML

Our discussion on a Modal-NTML is influenced by the modal logics based on alethic modality. That is, those that incorporate the notions of possibility and necessity. Our development of a Modal-NTML is based on the discussion of modal logics given in Turner, R., 1984, *Logic for Artificial Intelligence*, Ellis Horwood: Chichester, England. The following is a brief description of a Modal-NTML.

Inherent to modal logics is the notion of possible worlds. That is, a world is considered possible if it can be envisaged that such a world could really exist, possibly in the future. We augment NTML with two modal operators, L and M. L is interpreted as 'it is necessary,' and M is interpreted as 'it is possible.' LA is true if A is true in every possible world, and MA is true if A is true in some possible world. In Modal-NTML, L and M are defined with respect to security levels. That is, LA is true with respect to level L if A is true in every possible world that can be envisaged at level L. Similarly, MA is true with respect to L if A is true in some possible world envisaged at level L. To formalize these notions, we introduce multilevel modal frames.

A multilevel modal frame M is a structure <W,D,R,F> where (1) W is a nonempty set of possible multilevel worlds.

(2) D is a nonempty domain of individuals. Each individual has a security level assigned to it. D(L) is the set of individuals of D whose security levels are dominated by L.

(3) R is a binary relation of 'accessibility' on W with respect to a security level. That is, R(wi,wj,L) is true if the world at level L associated with the multilevel world wj is reachable from the world at level L associated with the multilevel world wj.

(4) F is a function which assigns (a) to each triple consisting of a function symbol (n-place, $n \geq 0$, level L), an element w of W, and level $L^* \geq L$, a function from $D^n(L^*)$ to $D(L^*)$, and (b) to each triple consisting of a relational symbol (n-place, $n \geq 0$, level=L), an element w of W, and level $L^* \geq L$, a relation on $D^n(L^*)$.

Note, that, if wj is reachable from wi via R at the Secret level, it does not imply that wj is reachable from wi via R at the Unclassified level. Similarly, wj is reachable from wi via R at the Unclassified level does not imply that wj is reachable from wi via R at the Secret level.

The interpretation of Modal-NTML differs from that of NTML because the set of multilevel worlds plays an important role. We now define the interpretation of formulas of Modal-NTML with respect to the multilevel modal frame M and a security level L. Let us assume that g is a function that assigns interpretations to all of the terms of Modal-NTML. Then a Modal-NTML formula A is interpreted with respect to world w and level L as follows:

(1) A is of the form C(t1, t2, ... tn). A is true with respect to world w and level L if and only if: <Val(t1, w, g, L), Val(t2, w, g, L), .... Val(tn, w, g, L)>Å F(w,C,L), where Val(ti, w, g, L) is the interpretation via g of the term ti with respect to world w and level L.

(2) The interpretations of A ∧ B, A ∨ B, ¬A, ∀x A are defined as in the case of NTML, except that they are ***with respect to a world w as well as a level L.

(3) If A is MB, then A is true with respect to world w and level L if there is some world w*, such that R(w,w*,L) and B is true with respect to world w* and level L.

Interpretation of other logical connectives, quantifiers, and modal operators can be defined from the basic ones given here. For example, it has been defined that LA is equivalent to ¬¬¬A. Therefore, once we have defined the interpretation of MA, we can define the interpretation of LA from the equivalence definition.

Several modal logics have been defined by assuming the relation R to be reflexive, transitive, and/or symmetric, and adding various axiom schema to the predicate calculus involving the modal operators L and M. Modal-NTMLs could also be developed under similar considerations. The following are the rules of inference which involve the modal operators for a multilevel environment.

(1) If LA is asserted at level L and it is not the case that A is negated at any possible world at level L*, where L* is the least level dominated by L, then LA is asserted at level L*.

(2) If MA is asserted at level L and it is not the case that A is negated at all possible worlds at level L*, where L* is the least level dominated by L, then MA is asserted at level L*.

Future work should include developing various Modal-NTMLs. This would involve the development of axiom systems, rules of inference, and proof procedures.

Section 9

Security of an NTML System

In this section we describe the security properties of the NTML language in a formal language and provide the direction that could be taken in order to show that an NTML-based system is secure. For this purpose, we describe a metatheory MT within which the security of an NTML system could be proved.

The security properties will include the properties described in section 3. It needs to be investigated as to whether or not additional security properties are necessary. In any case, we will describe a higher order language for MT and state its axioms. We also describe the security properties SP1 to SP8 as formulas of MT.

The types of MT include the following (these are in addition to types such as INTEGER, REAL, BOOLEAN etc.):
LEVSYM (for security levels)
TYPSYM (for NTML types)
VARSYM (for NTML variables)
CONSYM (for NTML constants)
TERMSYM (for NTML terms)
FUNSYM (for NTML functions)
PREDSYM (for NTML predicates)
ATOMSYM (for NTML atomic formulas)
FORMSYM (for NTML formulas)
SYSTEM (for formal systems, such as one based on NTML)
FORMULA (for MT formulas)
POLICY (for security policies)
PROP (for properties of systems)

The predicates of MT include the following (these are in addition to =, <, >, $\leq$, $\geq$, etc.):
typebelongsto (a type T belongs to the language of a system S)
verbelongto (a variable X belongs to the language of a system S)
conbelongsto (a constant C belong to the language of a system S)
funbelongsto (a function F belongs to the language of a system S)
predbelongsto (a predicate P belongs to the language of a system S)
termbelongsto (a term t belongs to a system S)
atombelongsto (an atomic formula A belongs to a system S)
formbelongsto (a formula F belongs to a system S)
typlev (type T has level L)
varlev (variable X has level L)
conlev (constant C has level L)
funlev (function F has level L)
predlev (predicate P has level L)
termlev (term t has level L)
atomlev (atomic formula A has level L)
formlev (formula F has level L)
vartyp (variable X has type T)
contyp (constant C has type T)
funtyp (function F has type T)
predtyp (predicate P has type T)
termtyp (term t has type T)
fargument (function F has number of arguments n)
pargument (predicate P has number of arguments n)
MTSP (system S satisfies the specified security properties)
NTMLSYS (system S is an NTML system)
SPOLICY (system S has security policy P)
PROPERTY (system S has properties R)
SECURE (system S is secure).

The functions of MT include the following:
for each i ($1 \leq i \leq n$), fargi (the ith argument of a function)
for each i ($1 \leq i \leq n$), pargi (the ith argument of a predicate)
for each i ($i \geq 2$), i-leastupperbound (the least upper bound of i symbols of type LEVSYM)

The security properties SP1 to SP8 are described as formulas of MJ, as follows:

MTSP1 (S) is the formula for stating that every type has a security level (where S is of type SYSTEM) and is equivalent to:
$\forall$T/TYPSYM (typebelongsto(T,S)$\rightarrow\exists$L/LEVSYM (typlev(T,L)))

MTSP2(S) is the formula for security property SP1 (where S is of type SYSTEM) and is equivalent to
$\forall$X/VARSYM (varbelongsto(X,S)$\rightarrow\exists$L/LEVSYM, T/TYPSYM (varlev (X,L $\wedge$ vartyp(X,T)))

MTSP3(S) is the formula for security property SP2 (where S is of type SYSTEM) and is equivalent to
$\forall$C/CONSYM(conbelongsto(X,S)$\rightarrow\exists$L/LEVSYM, T/TYPSYM (conlev(C,L $\wedge$ comyp(X,T)))

MTSP4(S) is the formula for security property SP3 (where S is of type SYSTEM) and is equivalent to
$\forall$F/FUNSYM(funbelongsto(F,S)$\rightarrow\exists$L, L1, L2, . . . Ln,L*/LEVSYM, T, T1, T2, . . . Tn/TYPSYM, n/INTEGER (fargument(F,n) A termtyp(farg1(F), T1) $\wedge$ termtyp(farg2(F), T2) $\wedge$ . . . $\wedge$ termtyp(fargn(F) Tn) A termtyp(fval(F), T) $\wedge$ funtyp (F, T1$\times$T2$\times$ . . . $\times$Tn$\rightarrow$T) $\wedge$ funlev (F,L) $\wedge$ L$\geq$n+1-leastupperbound (termtyp(farg 1(F), L1), termlev(farg2(F), L2) . . . termlev(fargn(F), Ln), termlev(fval(F), L*))))

MTSP5(S) is the formula for security property SP4 (where S is of type SYSTEM) and is equivalent to
$\forall$P/PREDSYM(predbelongsto(P,S)$\rightarrow\exists$L, L1, L2, . . . Ln/LEVSYM, T, T1, T2, . . . Tn/TYPSYM, n/INTEGER (pargument(P,n) $\wedge$ termtyp(parg1(P), T1) $\wedge$ termtyp(parg2(P), T2) $\wedge$ . . . $\wedge$ termtyp (pargn(P), Tn) $\wedge$ predtyp(F, T1$\times$T2$\times$ . . . $\times$Tn) A predlev (F,L) $\wedge$ L-$\geq$n-leastupperbound(termtyp(parg1(F), L1), termlev(parg2(F), L2), . . . termtlev(pargn(F), Ln))))

MTSP6(S) is the formula for security property SP5 (where S is of type SYSTEM) and is equivalent to
$\forall$t/TERMSYS(termbelongsto(t,S)$\rightarrow$varbelongsto(t,S) $\vee$ conbelongsto (C,S) $\vee$ $\exists$F/FUNSYM, t1,t2, . . . tn/TERMSYM, L, L1, L2, . . . Ln, L*LEVSYM (t=F(t1,t2, . . . tn) A funlev(F,L*) $\wedge$ termlev(t,L) $\wedge$ termlev(t2,L2) $\wedge$ . . . $\wedge$ termlev(tn,Ln) $\wedge$ L$\geq$n+1-leastupperbound(L1, L2, . . . Ln,L*)))

MTSP7(S) is the formula for security property SP6 (where S is of type SYSTEM) and is equivalent to
$\forall$A/ATOMSYM(atombelongsto(A,S)$\rightarrow\exists$P/PREDSYM, t1,t2, . . . , tn/TERMSYM, L, L1, L2, . . . , Ln,L*/LEVSYM (A=P(t1,t2, . . . tn) $\wedge$ predlev(F,L*) $\wedge$ atomlev(A,L) $\wedge$ termlev(t1,L1) $\wedge$ termlev(t2,L2) $\wedge$ . . . $\wedge$ termlev(tn,Ln) $\wedge$ L$\geq$n-leastupperbound(L1, L2, . . . , Ln)))

MTSP8(S) is the formula for security properties SP7 and SP8 (where S is of type SYSTEM) and is equivalent to
$\forall$F/FORMSYM(formbelongsto(F,S)$\rightarrow$atombelongsto(F,S) $\vee$
($\exists$F1/FORMSYM,L/LEVSYM (F=$\neg$F1 $\wedge$ formlev(F1, L) $\wedge$ formlev(F,L)) $\vee$
($\exists$F1,F2/FORMSYM,L1,L2,L/LEVSYM ((F=F1 L F2) A formlev(F1,L1) $\wedge$ formlev(F2,L2) A formlev(F,L) A L=2-leastupperbound(L1,L2))) $\vee$ ($\exists$F1,F2/FORMSYM, L1,L2,L/LEVSYM ((F=F1 V F2) L
  formlev(F1,L1) $\wedge$ formlev(F2,L2) $\wedge$ formlev(F,L)
  $\wedge$ L=2-leastupperbound(L1, L2))) V ($\exists$F1,F2/FORMSYM, L1,L2,L/LEVSYM (F=F1$\rightarrow$F2)
  $\wedge$ formlev(F1,,L1) $\wedge$ formlev(F2,L2) $\wedge$ L=2-leastup-
  perbound(L1,L2))) V ($\exists$F1/FORMSYM, X/VARSYM, T/TYPSYM (vartyp(X,
  T) $\wedge$ varlev(X,L1) $\wedge$ formlev(F1,L2)
$\wedge$ (F=$\forall$X/T F1) $\wedge$ formlev(F,L) $\wedge$ L=2-leastupper-
  bound(L1,L2)))

($\exists$F1/FORMSYM, X/VARSYM, T/TYPSYM (vartyp(X,
  T) $\wedge$ varlev(X,L1) $\wedge$ formlev(F1,L2)
$\wedge$ (F=$\exists$X/T F1) $\wedge$ formlev(F,L) $\wedge$ L=2-leastupper-
  bound(L1,L2)))

Note: In specifying the formulas $\forall$X/T F1 and $\exists$X/T F1, we only consider a single variable X instead of the tuple variable $\underline{X}$ given in section 3. We do this for convenience. We can extend the specification to include the tuple variable $\underline{X}$.

Let MTSP(S) be the conjunction of all the formulas which specify the security properties. That is, the formulas MPSP1(S), MPSP2(S), . . . MPSP8(S) will be included in the specification of MPSP(S).

The axioms of MT include the following:

A1: $\forall$S/SYSTEM, F/FORMULA (F=MTSP(S)$\rightarrow$ NYMLSYS(S))

A2: $\forall$S/SYSTEM (NTMLSYS(S)$\rightarrow\exists$ P/POLICY (SPOLICY(S,P)))

A3: $\forall$S/SYSTEM, P/POLICY (SPOLICY(S,P)$\rightarrow\exists$ R/PROP (PROPERTY(S,R)))

A4: $\forall$S/SYSTEM, R/PROPERTY (PROPERTY(S,R)$\rightarrow$ SECURE(S))

A1 states that any system S which satisfies the security properties as given by the formula. MTSP(S) is an NTML system.

A2 states that an NTML system should satisfy the security policy P. Note that we need to formulate the policy P.

A3 states that any system S which satisfies the policy P has some properties given by R. Again, we need to determine the properties given by R.

A4 states that any system S which has property R is secure. The inference rule of MT includes MP.

That is, from A and A$\rightarrow$B deduce B.

Future work will include determining the policy of an NTML system and also formulating a set of properties that result from the security policy. Then, given any system, to determine whether it is secure, we need only to prove that it is an NTML system.

We have discussed only one approach which could be used to prove that an NTML system is secure. We need to explore other approaches to prove the security of such a system.

I claim:

1. Apparatus for design of a multilevel secure database management system based on a multilevel logic programming system comprising:
  a multilevel knowledge base including:
    (a) a multilevel database in which data are classified at different security levels;
    (b) schema which describe the data in the database;
    (c) rules which are used to deduce new data;
    (d) integrity constraints which are constraints enforced on the data;
    (e) security constraints which are rules that assign security levels to the data;
  users cleared to the different security levels for querying the multilevel database; and
  a multilevel logic programming system for accessing the multilevel knowledge base for processing queries and for processing the integrity and security constraints,
  whereby the multilevel database management system (1) makes deductions and gives complete answers to queries and (2) prevent certain unauthorized inferences.

2. Apparatus of claim 1 wherein the multilevel logic programming system is based on a nonmonotonic typed multilevel logic whose syntax comprises the following entities:
  (1) primitive symbols,
  (2) terms,
  (3) atomic formulas,
  (4) well-formed formulas;
  each entity having a type and a security level, and
  whose semantics comprises assignment of truth values to the entities which vary with different security levels thereby making the logic nonmonotonic.

3. Apparatus of claim 2 wherein the design of the multilevel logic programming system is based upon nonmonotonic typed multilevel logic and comprises a methodology for processing queries of the users at different security levels.

4. The apparatus of claims 1, 2 or 3 wherein the multilevel database, the schema, the integrity constraints and the security constraints are expressed as formulas of a nonmonotonic typed multilevel logic and the multilevel logic programming system processes the formulas to answer queries of users at different security levels.

5. The apparatus of claim 4 wherein only part of the multilevel database, the schema, the integrity constraints and the security constraints are expressed as formulas of a nonmonotonic typed multilevel logic, and the multilevel logic programming system processes the formulas to answer queries at different security levels, the rest being performed by an existing multilevel secure database management system.

* * * * *

UNITED STATES PATENT AND TRADEMARK OFFICE
CERTIFICATE OF CORRECTION

PATENT NO. : 5,481,700

DATED : January 2, 1996

INVENTOR(S) : Bhavani M. Thuraisingham

It is certified that error appears in the above-indentified patent and that said Letters Patent is hereby corrected as shown below:

Column 5, line 49: after "L" please delete "," and insert therefor -- ; --;

Column 8, line 42: please delete "us" and insert therefor -- is --;

Column 9, line 9: please delete "and" and insert therefor -- an --;

Column 9, line 16: please delete "them" and insert therefor -- there --;

Column 13, line 15: please delete "Lemma" and insert therefor -- Theorem --;

Column 13, line 20: before "$\underline{x}/\underline{T}(P)$" please delete " " ";

Column 33, line 48: after "earlier" please delete ";" and insert therefor -- , --;

Column 44, line 7: please delete "am" insert --are--;

Column 45, line 48: after "not" and before "be" please insert -- to --;

Column 48, line 59: please delete "move" and insert therefor -- more --;

Column 52, line 43: please delete "Could" and insert therefor -- could --;

Column 59, line 37: please delete "verbelongto" and insert therefor -- verbelongsto --; and

UNITED STATES PATENT AND TRADEMARK OFFICE
CERTIFICATE OF CORRECTION

PATENT NO. : 5,481,700
DATED : January 2, 1996
INVENTOR(S) : Bhavani M. Thuraisingham It is certified that error appears in the above-indentified patent and that said Letters Patent is hereby corrected as shown below:

Column 59, line 39: please delete "belong" and insert therefor -- belongs --.

Signed and Sealed this

Twenty-second Day of October, 1996

Attest:

BRUCE LEHMAN

*Attesting Officer*  *Commissioner of Patents and Trademarks*